(12) United States Patent
Wang et al.

(10) Patent No.: US 12,401,867 B2
(45) Date of Patent: Aug. 26, 2025

(54) METHOD, APPARATUS, DEVICE, STORAGE MEDIUM AND PROGRAM FOR DISPLAYING A FEED FLOW

(71) Applicant: Beijing Zitiao Network Technology Co., Ltd., Beijing (CN)

(72) Inventors: Chuanping Wang, Beijing (CN); Rongrong Zhu, Beijing (CN); Zeyu Li, Beijing (CN); Huang Qi, Beijing (CN); Kai Hou, Beijing (CN); Xin Li, Beijing (CN); Xiaotian Wang, Beijing (CN); Tengtai Cui, Beijing (CN); Jixin Zhang, Beijing (CN); Jiafeng Gu, Beijing (CN); Jingtong Jian, Beijing (CN); Cong Peng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/806,188

(22) Filed: Aug. 15, 2024

(65) Prior Publication Data

US 2024/0406520 A1    Dec. 5, 2024

Related U.S. Application Data

(63) Continuation of application No. PCT/CN2023/080361, filed on Mar. 8, 2023.

(30) Foreign Application Priority Data

Mar. 11, 2022    (CN) .......................... 202210238738.6

(51) Int. Cl.
*H04N 5/445*        (2011.01)
*G06F 3/04883*      (2022.01)
(Continued)

(52) U.S. Cl.
CPC ..... *H04N 21/8545* (2013.01); *G06F 3/04883* (2013.01); *H04N 21/4782* (2013.01)

(58) Field of Classification Search
CPC ............ H04N 21/8545; H04N 21/4782; G06F 3/04883
(Continued)

(56) References Cited

U.S. PATENT DOCUMENTS

2013/0147825 A1 *  6/2013  Martin ................ G06F 3/04883
                                           345/589
2013/0232430 A1    9/2013  Reitan
(Continued)

FOREIGN PATENT DOCUMENTS

CN    107596687 A    1/2018
CN    109146530 A    1/2019
(Continued)

OTHER PUBLICATIONS

China National Intellectual Property Administration, Office Action Issued in Application No. 202210238738.6, Aug. 21, 2023, 24 pages.
(Continued)

*Primary Examiner* — Nasser M Goodarzi
*Assistant Examiner* — Sahar Aqil Riaz
(74) *Attorney, Agent, or Firm* — Alleman Hall & Tuttle LLP

(57)    ABSTRACT

Embodiments of the disclosure provides a method, an apparatus and a device for displaying a feed flow. The method includes: presenting a feed flow interface; displaying a video content corresponding to a first feed flow element in the feed flow in the feed flow interface, a type of the first feed flow element being a video type; in response to detecting a predetermined swipe operation input by a user in the feed flow interface, determining a second feed flow element to be
(Continued)

displayed in the feed flow; in response to a type of the second feed flow element being an interactive type, loading an interactive material of an interactive content recommended by the second feed flow element into the Web View container; displaying an interaction process of the interactive content in the feed flow interface, the interaction process presenting a process of the interactive material changing with an interaction operation.

20 Claims, 9 Drawing Sheets

(51) Int. Cl.
*H04N 21/4782* (2011.01)
*H04N 21/8545* (2011.01)

(58) Field of Classification Search
USPC .......................................................... 725/37
See application file for complete search history.

(56) References Cited

U.S. PATENT DOCUMENTS

| | | | |
|---|---|---|---|
| 2014/0087883 A1 | 3/2014 | Lee et al. | |
| 2014/0095328 A1* | 4/2014 | Forouzandeh | G06Q 30/0277 705/14.73 |
| 2015/0135198 A1* | 5/2015 | Pack, III | G06F 9/542 719/318 |
| 2015/0200889 A1* | 7/2015 | Hemar | G06Q 10/10 715/748 |
| 2015/0277687 A1* | 10/2015 | Jhang | G06F 3/0484 715/760 |
| 2016/0071156 A1* | 3/2016 | Li | G06Q 20/387 705/14.64 |
| 2016/0077899 A1* | 3/2016 | Samuel | G06F 9/542 719/318 |
| 2016/0080830 A1 | 3/2016 | Kim et al. | |
| 2016/0202879 A1* | 7/2016 | Chen | H04L 51/52 715/753 |
| 2017/0214973 A1 | 7/2017 | Slaughter et al. | |
| 2018/0077461 A1* | 3/2018 | Li | H04N 21/20 |
| 2018/0376216 A1* | 12/2018 | Zhou | H04N 21/44016 |
| 2019/0018666 A1* | 1/2019 | Sheng | H04L 67/06 |
| 2019/0370024 A1* | 12/2019 | Narula | G06F 9/44594 |
| 2019/0392025 A1* | 12/2019 | Su | G06F 40/117 |
| 2021/0168433 A1* | 6/2021 | Meng | H04N 21/2383 |
| 2021/0264517 A1* | 8/2021 | Harris | G06Q 20/123 |
| 2022/0236844 A1* | 7/2022 | Luo | G06F 9/451 |
| 2022/0337745 A1* | 10/2022 | Gu | H04N 21/21805 |
| 2022/0397995 A1* | 12/2022 | Misra | G06F 3/0483 |
| 2023/0400966 A1* | 12/2023 | Wang | G06F 3/04883 |
| 2024/0082715 A1* | 3/2024 | Yu | A63F 13/44 |
| 2024/0232506 A1* | 7/2024 | Lu | G06F 40/106 |
| 2024/0393914 A1* | 11/2024 | Jian | G06F 3/0488 |

FOREIGN PATENT DOCUMENTS

| | | |
|---|---|---|
| CN | 110111125 A | 8/2019 |
| CN | 110611847 A | 12/2019 |
| CN | 111177610 A | 5/2020 |
| CN | 111580913 A | 8/2020 |
| CN | 111580914 A | 8/2020 |
| CN | 111669639 A | 9/2020 |
| CN | 112565835 A | 3/2021 |
| CN | 112817781 A | 5/2021 |
| CN | 112925463 A | 6/2021 |
| CN | 113031842 A | 6/2021 |
| CN | 113076101 A | 7/2021 |
| CN | 113495664 A | 10/2021 |
| CN | 113923499 A | 1/2022 |
| CN | 113986003 A | 1/2022 |
| CN | 114007143 A | 2/2022 |
| CN | 114065080 A | 2/2022 |
| CN | 114610428 A | 6/2022 |
| JP | 2002112170 A | 4/2002 |
| WO | 2021227721 A1 | 11/2021 |
| WO | 2023169483 A1 | 9/2023 |

OTHER PUBLICATIONS

European Patent Office, Extended European Search Report Issued in Application No. 23766060.0, Apr. 8, 2025 Germany, 11 pages.
Japan Patent Office, Office Action Issued in Application No. JP2024-547656, Mar. 4, 2025, 5 pages.
Zhang, H et al., "Design and Implementation of Remote Experiment System Based on RIA," Journal of Electronic Science and Technology, vol. 29, No. 5, May 15, 2016, 5 pages.
Ran, D. et al., "Preference-Aware Dynamic Bitrate Adaptation for Mobile Short-Form Video Feed Streaming," IEEE Access, vol. 8, Dec. 4, 2020, 12 pages.
Ling, P. et al., "Short video advertising precision marketing strategy," Co-Operative Economy and Science, Mar. 1, 2022, 12 pages.
Ouyang, C. et al., "Research on platform construction and traffic realization of Tiktok short video," Journalism Tide, vol. 10, Oct. 28, 2021, 5 pages. Submitted with English abstract.
Xue, X. et al., "Research and Practice of Curriculum Resources Construction Mode in Higher Vocational Colleges under the Background of Internet Plus", Communication of Vocational Education, vol. 10, Oct. 10, 2020, 7 pages. Submitted with English abstract.
China National Intellectual Property Administration, Office Action and Search Report Issued in Application No. 202210238738.6, Mar. 22, 2024, 6 pages.

* cited by examiner

METHOD, APPARATUS, DEVICE, STORAGE MEDIUM AND PROGRAM FOR DISPLAYING A FEED FLOW

CROSS REFERENCE

This application is a continuation of International Patent Application No. PCT/CN2023/080361, filed on Mar. 8, 2023, which claims the benefit of Chinese Patent Application No. 202210238738.6, filed on Mar. 11, 2022, and entitled "METHOD, APPARATUS, DEVICE, STORAGE MEDIUM AND PROGRAM FOR DISPLAYING A FEED FLOW", both of which are incorporated herein by reference in their entireties.

FIELD

Embodiments of the present disclosure relate to the field of human-computer interaction technologies, and in particular, to a method, an apparatus, a device for displaying a feed flow, storage medium, a program product and a program.

BACKGROUND

Feed flow is a data format that continuously provides contents to a user. The feed flow includes a set of contents, such as, a set of videos, a set of graphic and text information, etc.

Typically, a plurality of feed flow elements included in a feed flow are of a same type, for example, all of them are of video type. In this way, when displaying a feed flow, a terminal device sequentially displays a video content corresponding to each feed flow element via a player container according to the swipe operation input by a user.

However, based on the above-described approach, the user can only watch video content in the process of browsing the feed flow, resulting a poor interactivity.

SUMMARY

Embodiments of the present disclosure provide a method, an apparatus, and a device for displaying a feed flow, storage medium, a program product and a program, to improve the interactivity of the process of a user browsing the feed flow.

According to a first aspect, the embodiments of the present disclosure provide a method for displaying a feed flow, which is applied to a terminal device. The terminal device comprises a feed flow client, a player container, and a Web View container. The method comprises:
  presenting a feed flow interface;
  displaying, via the player container, a video content corresponding to a first feed flow element in the feed flow in the feed flow interface, a type of the first feed flow element being a video type;
  in response to detecting a predetermined swipe operation input by a user in the feed flow interface, determining, via the feed flow client, a second feed flow element to be displayed in the feed flow;
  in response to a type of the second feed flow element being an interactive type, loading, via the feed flow client, an interactive material of an interactive content recommended by the second feed flow element into the Web View container;
  displaying, via the Web View container, an interaction process of the interactive content in the feed flow interface, the interaction process presenting a process of the interactive material changing with an interaction operation input by the user, and the interaction process indicating an interaction process of using the interactive content.

According to a second aspect, the embodiments of the present disclosure provide an apparatus for displaying a feed flow, comprising: a feed flow client, a player container, and a Web View container; wherein,
  the player container is configured to display a video content corresponding to a first feed flow element in the feed flow in the feed flow interface, wherein a type of the first feed flow element is a video type;
  the feed flow client is configured to determine a second feed flow element to be displayed in the feed flow in response to detecting a predetermined swipe operation input by a user in the feed flow interface;
  the feed flow client is further configured to, in response to a type of the second feed flow element being an interactive type, load an interactive material of an interactive content recommended by the second feed flow element into the Web View container;
  the Web View container is configured to display an interaction process of the interactive content in the feed flow interface, the interaction process presenting a process of the interactive material changes with an interaction operation input by the user, and the interaction process indicating an interaction process of using the interactive content.

According to a third aspect, the embodiments of the present disclosure provide an electronic device, including: a processor and a memory;
  the memory stores computer execution instructions;
  the processor executes the computer executable instructions to carry out the method according to the first aspect.

According to a fourth aspect, the embodiments of the present disclosure provide a computer readable storage medium. The computer readable storage medium has computer executable instructions stored thereon, wherein the computer executable instructions, when executed by a processor, carry out the method according to the first aspect.

According to a fifth aspect, the embodiments of the present disclosure provide a computer program product, including a computer program, wherein the computer program, when executed by a processor, carry out the method according to the first aspect.

According to a sixth aspect, the embodiments of the present disclosure provide a computer program, which when executed by a processor implements the method according to the first aspect.

Embodiments of the present disclosure provide a method, an apparatus, a device for displaying a feed flow, storage medium, and program. The method comprises: presenting a feed flow interface; displaying, via the player container, a video content corresponding to a first feed flow element in the feed flow in the feed flow interface, a type of the first feed flow element being a video type; in response to detecting a predetermined swipe operation input by a user in the feed flow interface, determining, via the feed flow client, a second feed flow element to be displayed in the feed flow; in response to a type of the second feed flow element being an interactive type, loading, via the feed flow client, an interactive material of an interactive content recommended by the second feed flow element into the Web View container; displaying, via the Web View container, an interaction process of the interactive content in the feed flow interface, the interaction process presenting a process of the interactive material changing with an interaction operation input by the user, and the interaction process indicating an interaction process of using the interactive content.

BRIEF DESCRIPTION OF THE DRAWINGS

To clearly illustrate the embodiments of the present disclosure or the technical solutions in the prior art, the accompanying drawings used in the description of the embodiments or the prior art will be briefly described below. It is apparent that the accompanying drawings in the following description are some of the embodiments of the present disclosure, and for those skilled in the art, other accompanying drawings can be acquired based on these accompanying drawings without creative efforts.

DETAILED DESCRIPTION

Figure 1:
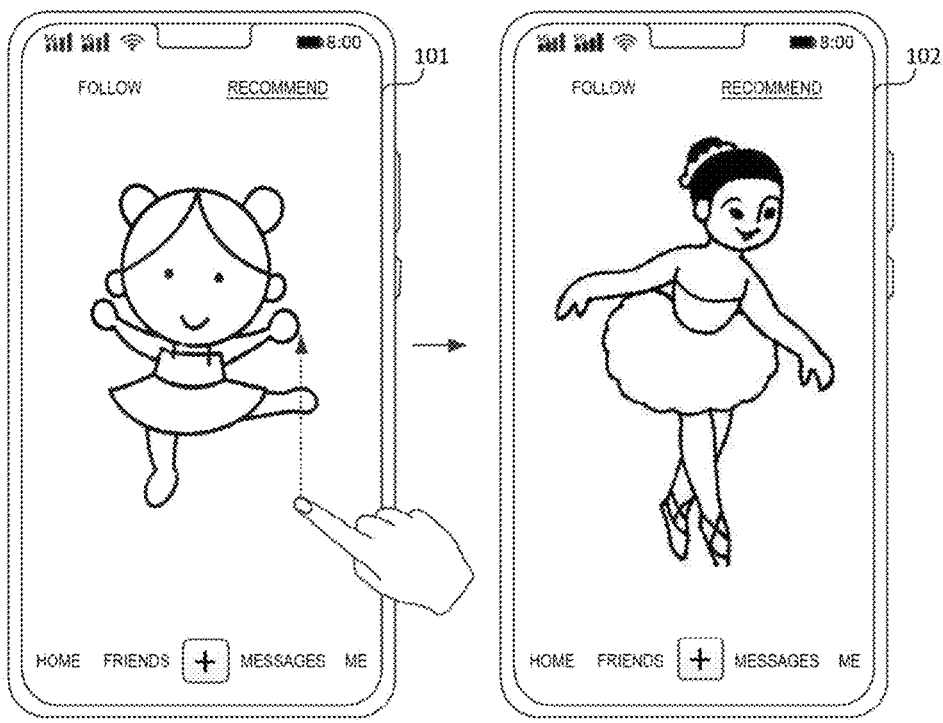
FIG. 1 is a schematic diagram of a feed flow display scenario provided by the embodiments of the present disclosure.

To make the objectives, technical solutions, and advantages of the embodiments of the present disclosure clearer, in the following, the technical solutions in embodiments of the present disclosure will be described clearly and completely in connection with the accompanying drawings in the embodiments of the present disclosure. It is apparent that the described embodiments are part of the embodiments of the present disclosure, but not all of them. Based on the embodiments of the present disclosure, all other embodiments acquired by those skilled in the art without creative efforts should fall within the scope of protection of the present disclosure.

The technical solutions provided by the embodiments of the present disclosure may be applied to scenarios where a terminal device display a feed flow. The terminal device may be any electronic device with a feed flow display function, including but not limited to: mobile phones, laptops, tablets, smart in-car devices, smart wearable devices, smart screens, etc.

To facilitate understanding, the terms involved in the embodiments of the present disclosure are explained.

The feed flow, also known as a feed stream, is a data format that continuously provides contents to a user. The feed flow includes a set of information/contents, such as, a set of videos, a set of graphic and text information, etc.

A feed flow element refers to each piece of information/content in the feed flow. For example, in an example of a video feed flow, each video therein is a feed flow element.

A feed flow interface refers to an interface in the terminal device for displaying the feed flow.

A Web View container, also referred to as a Web page container, is an embedded browser. The Web View container is used for carrying the material contained in a page, and may also be used for displaying the material contained in the page, so that the terminal device presents the page.

In the embodiments of the present disclosure, the terminal device is installed with a feed flow push application program. The feed flow client, the player container, and the Web View container may respectively correspond to different modules/processes of the feed flow push application. The feed flow client corresponds to a module of for the feed flow pushing application that implements the client functions. For example, the feed flow client may control the display order and timing of each of the feed flow elements according to a swipe operation input by the user. The player container is used for carrying and displaying the feed flow elements of a video type. The Web View container is a browser embedded in the feed flow pushing application, and is used for carrying and displaying the feed flow elements of an interactive type. The Web View container may carry and display H5 pages.

In practical applications, the feed flow client is generally a program developed to match the operating system of the terminal device. For example, the feed flow client on a terminal device of an Android system is usually different from the feed flow client on a terminal device of an iOS system. The feed flow client may be referred to as a native application client. In the embodiments of the present disclosure, the Web View container is compatible with different operating systems, and may also be referred to as a cross-end container. In this way, a set of page materials can be shared for terminal devices of different operating systems.

FIG. 1 is a schematic diagram of a feed flow display scenario according to the embodiments of the present disclosure. An example is illustrated with a feed flow that includes a set of videos (for example, video A, video B, video C, . . . , etc.). As shown in FIG. 1, an interface 101 and an interface 102 are both feed flow interfaces. The video A in the feed flow is displayed in the interface 101. When the user wants to watch the next video in the feed flow, a predetermined swipe operation (for example, a swipe-up operation) may be input in the interface 101. The terminal device displays the video B in the feed flow in response to the predetermined swipe operation, as shown in the interface

102. It should be understood that the interface 101 and interface 102 illustrate only a certain image frame of the video.

Typically, a plurality of feed flow elements included in a feed flow are of a same type, for example, all of them are of video type. In this way, when displaying a feed flow, a terminal device sequentially displays a video content corresponding to each feed flow element via a player container according to the swipe operation input by a user. However, based on the above-described approach, the user can only watch video content in the process of browsing the feed flow, resulting a poor interactivity.

Figure 2:
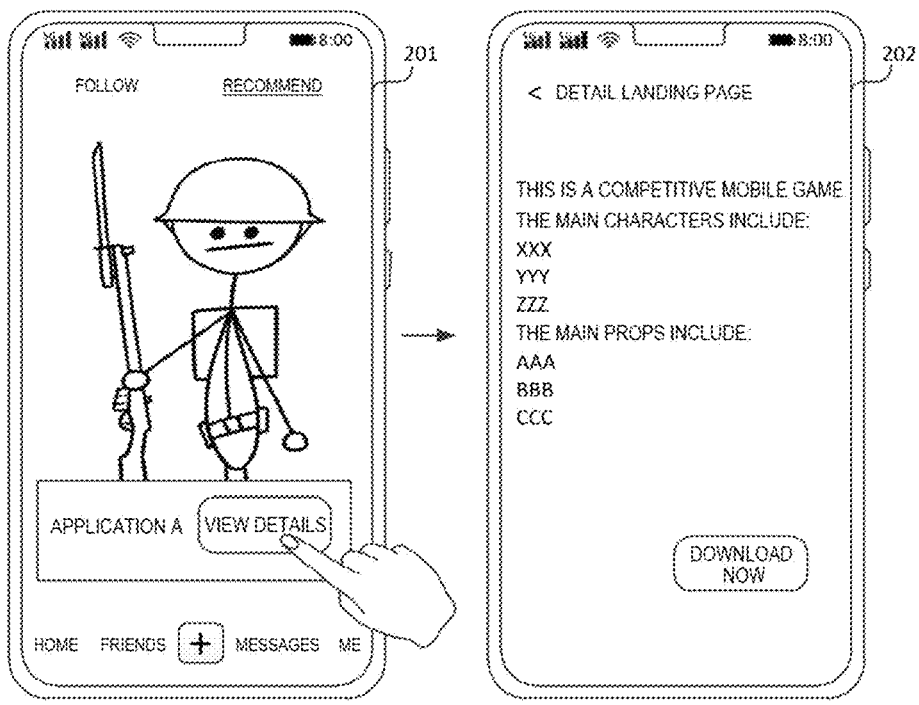
FIG. 2 is a schematic diagram of an interface for recommending an application program in a feed flow in the related art.

In some possible implementations, the terminal device provides a certain interactive function in the feed flow. For example, the terminal device may recommend some contents in the feed flow to the user, such as, recommending an application program, recommending mini-games on web pages, and so on. FIG. 2 is a schematic diagram of an interface for recommending an application program in a feed flow in the related art. As shown in FIG. 2, in the example of recommending an application program A, a recommendation video of application A may be inserted into the feed flow, and the recommendation video is used to introduce related information of application A. For example, assuming that application A is a game program, the recommendation video of application A may include one or more game screens. In a process of the user browsing a feed flow, when displaying the recommendation video of application A, the terminal device may display a "View Details" control in the feed flow interface, as shown in the interface 201. When the user clicks on the control, the terminal device jumps to display a detail landing page corresponding to application A, in which more detailed information about application A and a download control for application A are presented, as shown in the interface 202.

In the related art as described above, if the user is interested in the application program recommended by the feed flow element, the user may click the "View Details" control in the feed flow interface, so that the terminal device jumps to the detail landing page. The user may determine whether to download the application A based on the detailed information shown in the detail landing page. However, in practice, it has been found that the probability of the user clicking on the "View Details" control when browsing the feed flow is relatively low, resulting in a poor effect of application recommendation. In addition, for a content recommendation party, it is necessary to produce not only the recommendation video of application A but also the detail landing page of application A. It is also necessary to consider the association between the contents of the two, so that the cost for content production is relatively high.

In order to solve the above technical problems, the present disclosure provides a method, an apparatus, a device for displaying a feed flow, a storage medium and a program. The terminal device comprises a feed flow client, a player container and a Web View container. In the process of the user browsing a feed flow, for a feed flow element of a video type, a corresponding video content may be displayed in a feed flow interface via the player container; for a feed flow element of an interactive type, an interactive material of an interactive content to be recommended may be loaded into the Web View container via the feed flow client, and an interaction process of the interactive content is displayed in the feed flow interface via the Web View container. The interaction process presents a process of the above-described interactive material changing with an interaction operation input by the user. The interaction process indicates an interaction process of using the interactive content. In other words, displaying the interaction process of the interactive content in the feed flow interface is actually displaying the user's try-to-play/trying out process of the interactive content.

In the technical solutions provided in the present disclosure, in the process of the user browsing the feed flow, the user may interact with the feed flow, which improves the interactivity of the feed flow. Further, in the process of browsing the feed flow, it is not necessary to jump to the landing page, and the user may directly try to play/try out the interactive content in the feed flow interface, which improves the interactivity of the user's browsing process, and deepens the user's understanding of the interactive content, and thus improves the interactive content recommendation effect. In addition, by means of try-to-play/trying out, the user can understand the interactive content more deeply, thereby improving the recommendation effect of the interactive content. In addition, with regard to a content recommendation party, it only needs to produce interactive materials for realizing the described interaction process, which reduces the cost of content production.

The technical solutions provided by the present disclosure will be described in detail below in connection with several specific embodiments. Several embodiments may be combined with each other, and the same or similar concepts or processes may not be repeated in some embodiments.

Figure 3:
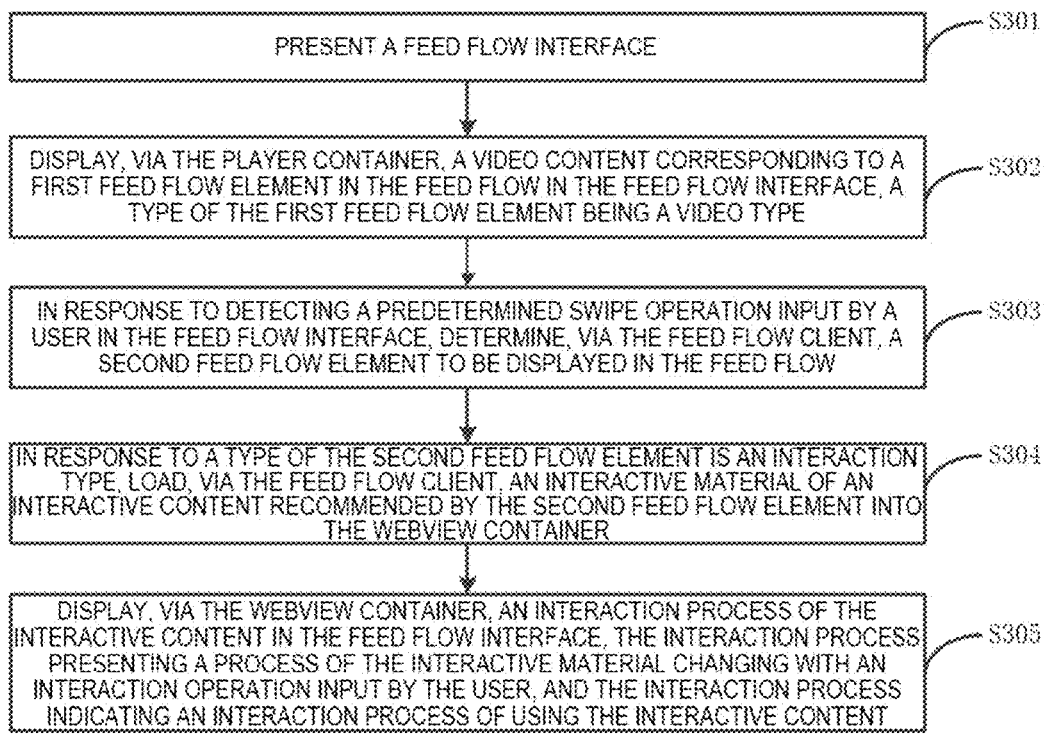
FIG. 3 is a flowchart of a method for displaying a feed flow provided by the embodiments of the present disclosure.

FIG. 3 is a flowchart of a method for displaying a feed flow provided by the embodiments of the present disclosure. The example method may be performed by a terminal device. The terminal device includes a feed flow client, a player container, and a Web View container. As shown in FIG. 3, the method of the embodiments includes:

S301: presenting a feed flow interface.

S302: displaying, via the player container, a video content corresponding to a first feed flow element in the feed flow in the feed flow interface, a type of the first feed flow element being a video type.

In the embodiments of the present application, the feed flow comprises a plurality of feed flow elements, and the plurality of feed flow elements are arranged in an order. The user may browse the plurality of feed flow elements in order.

The first feed flow element is one of the plurality of feed flow elements. Types of the feed flow elements may be categorized into a video type and an interactive type. If the type of a feed flow element is the video type, it indicates that the feed flow element is used to present a certain video to the user. If the type of a feed flow element is the interactive type, it indicates that the feed flow element is used to recommend a certain content to the user in an interactive manner, for example, recommending an application program, a web page program, and the like.

The player container is used for bearing and displaying a feed flow element of the video type. That is to say, if the feed flow element currently browsed by the user is of the video type, corresponding video content is displayed in the feed flow interface via the player container.

S303: in response to detecting a predetermined swipe operation input by a user in the feed flow interface, determining, via the feed flow client, a second feed flow element to be displayed in the feed flow.

In this embodiment, when the user inputs the predetermined swipe operation in the feed flow interface, it indicates that the user wants to switch the feed flow element currently displayed in the feed flow interface to browse other feed flow elements. This embodiment does not specifically limit a type of the predetermined swipe operation. By way of example, the predetermined swipe operation may be, but is not limited to, one of the following: a swipe-up operation, a swipe-down operation, a swipe-left operation, a swipe-right operation, and so on.

In the following, the swipe-up operation and the swipe-down operation are taken as examples for illustration.

When it is detected that the user inputs a swipe-up operation in the feed flow interface, it indicates that the user wants to browse a next feed flow element of the current feed flow element. When a swipe-down operation input by the user in the feed flow interface is detected, it indicates that the user wants to browse a previous feed flow element of the current feed flow element. The current feed flow element refers to a feed flow element currently displayed in a feed flow interface. For example, assuming that the feed flow includes: Video A, Video B, Video C, . . . , etc., Video B is currently displayed in the feed flow interface. When the swipe-up operation input by the user in the feed flow interface is detected, it means that the second feed flow element to be displayed is Video C. When the swipe-down operation input by the user in the feed flow interface is detected, the second feed flow element to be displayed is Video A.

S304: in response to a type of the second feed flow element being an interactive type, loading, via the feed flow client, an interactive material of an interactive content recommended by the second feed flow element into the Web View container.

S305: displaying, via the Web View container, an interaction process of the interactive content in the feed flow interface, the interaction process presenting a process of the interactive material changing with an interaction operation input by the user, and the interaction process indicating an interaction process of using the interactive content.

In this embodiment, after the type of the second feed flow element is determined, the type of the second feed flow element may further be determined. The type of the second feed flow element may be the interactive type or the video type.

In a case where the type of the target feed flow element is the video type, the video content corresponding to the target feed flow element is displayed in the feed flow interface via the player container.

Figure 4:
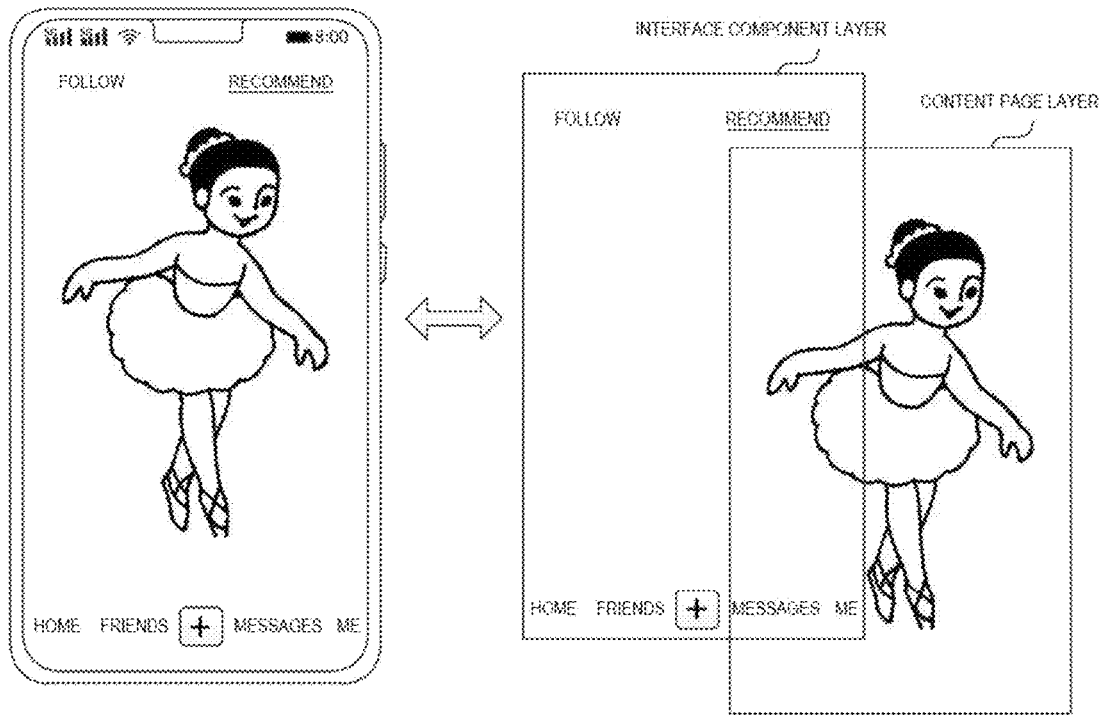
FIG. 4 is a schematic diagram of a feed flow interface according to the embodiments of the present disclosure.

As an example, FIG. 4 is a schematic diagram of a feed flow interface according to the embodiments of the present disclosure. As shown in FIG. 4, assuming that a feed flow interface is displaying a certain video, in this case, the feed flow interface includes a content page layer and an interface component layer overlapping on the content page layer. The content page layer is used for displaying a video picture. The content page layer is a page layer corresponding to the player container. The interface component layer comprises at least one interface component. The interface component layer is a layer with a transparent background. Overlapping the interface component layer on the content page layer does not obscure the video picture. It is understood that, in the example shown in FIG. 4, the page content presented by the content page layer is carried and displayed by the player container.

In this embodiment, in a case where the type of the second feed flow element is the interactive type, the content recommended by the second feed flow element is referred to as interactive content. The interactive content may be an application (APP) or a Web program. The web program, also known as a webpage program, refers to a program that can be embedded in a web page, such as a page game. In this case, the interactive material of the interactive content is loaded into the Web View container via the feed flow client. By way of example, the feed flow client sends the interactive material of the interactive content to the Web View container. The interaction process of the interactive content is displayed in the feed flow interface via the gateway view container.

The interactive material refers to various visual objects that participate in the human-computer interaction operations during the interaction process. Interactive material may usually change position and/or display effects based on human-computer interaction operations. The embodiments do not limit the types of interactive materials, which may include graphics and text information, animations, videos, audio, and so on. The number of the interactive materials of the interactive content may be more than one.

The interaction operations input by the user include, but are not limited to, a click operation, a swipe operation, a drag operation, a press operation, and so on. By way of example, in a process of displaying the interactive material in the feed flow interface, a user may perform operations such as clicking, swiping, dragging, pressing, and so on on the interactive material, so as to trigger the interactive material to change with the interaction operation input by the user, thereby forming the above-described interaction process.

In the above-described interaction process, the interactive material displayed in the feed flow interface corresponds to a page content seen by the user when actually using the interactive content. The interaction operations input by the user for the interactive material correspond to the operations that the user needs to input when actually using the interactive content. It can be seen that the interaction process reflects the user's try-to-play/trying out process of the interactive content, or in other words, the above-described interaction process reflects the interaction process of using the interactive content.

In some possible implementations, an interactive page layer is added between the content page layer and the interface component layer of the feed flow interface via the feed flow client, and the size of the interactive page layer is the same as the size of the content page layer. The interaction process is displayed in the interactive page layer via the Web View container.

Figure 5:
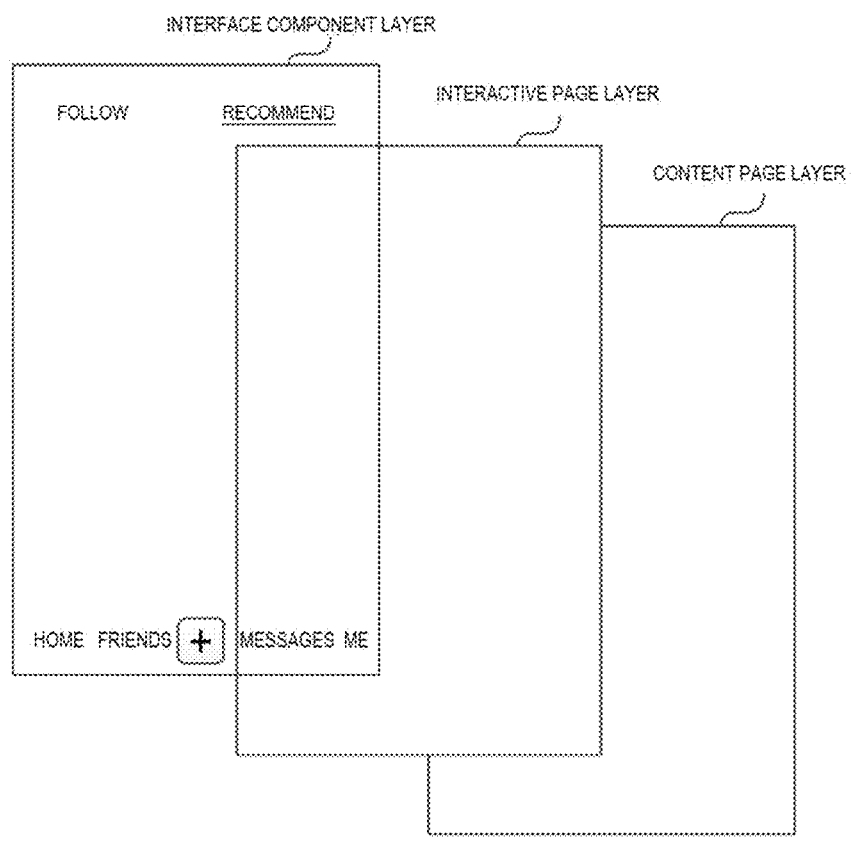
FIG. 5 is a schematic diagram of another feed flow interface according to the embodiments of the present disclosure.

As an example, FIG. 5 is a schematic diagram of another feed flow interface according to the embodiments of the present disclosure. FIG. 5 illustrates an interface composition of the feed flow interface in a case of displaying the interaction process. As shown in FIG. 5, the feed flow interface includes a content page layer, an interactive page layer, and an interface component layer. The interactive page layer is located on top of the content page layer, and the interface component layer is located on top of the interactive page layer. The interactive page layer is used for displaying the interaction process of the interactive content. The interactive page layer is a non-transparent layer. The size of the interactive page layer is the same as the size of the content page layer, so that the interactive page layer completely obscures the content page layer.

That is to say, in a case where the type of the second feed flow element to be displayed is the video type, the video picture is displayed on the content page layer via the player container. In a case where the type of the second feed flow element to be displayed is the interactive type, the interactive page layer is added between the content page layer and the interface component layer, and the interaction process of the interactive content is displayed through the interactive page layer. When a feed flow element of the video type needs to be displayed after the interaction process ends, the interactive page layer may be deleted, or the interactive page layer may be set to be transparent. In this way, the video and the interactive content are carried in different page layers, which are independent of each other and do not affect each other. For example, in some scenarios, different operable areas may be set for the interactive page layer and the content page layer respectively, thereby satisfying different interaction requirements.

In the embodiments of the present application, the interactive page layer is a page layer based on the hypertext markup language revision 5 (HTML5 or H5), i.e., the interaction process viewed by the user in the feed flow interface is a H5 page carried and displayed via the Web View container. The H5 page has a cross-end feature, and can be adapted to terminal devices of different systems, and has a low development cost.

In the embodiments of the present application, the player container and the Web View container are deployed in a terminal device, so that in a process of the user browsing the feed flow, when the user browses a feed flow element of the video type, a corresponding video content is displayed in the feed flow interface via the player container, and when the user browses a feed flow element of the interactive type, a corresponding interaction process is displayed in the feed flow interface via the Web View container, and thus the user can directly perform interaction in the feed flow, and the interactivity of the feed flow is improved.

In some possible implementations, the interactive materials of the interactive content may include: M interaction triggering materials and corresponding interaction result materials for each interaction triggering material. M is an integer greater than or equal to 1. In this way, the interaction process of the interactive content may be displayed as follows:

(1) displaying the first interaction triggering material in the interactive page layer via the Web View container; in response to detecting an interaction operation input by the user for the first interaction triggering material, displaying an interaction result material corresponding to the first interaction triggering material in the interactive page layer via the Web View container.

(2) displaying the second interaction triggering material in the interactive page layer via the Web View container; in response to detecting an interaction operation input by the user for the second interaction triggering material, displaying an interaction result material corresponding to the second interaction triggering material in the interactive page layer via the Web View container.

By analogy, until the M-th interaction triggering material is displayed in the interactive page layer via the Web View container; in response to detecting an interaction operation input by the user for the M-th interaction triggering material, displaying an interaction result material corresponding to the M-th interaction triggering material in the interactive page layer via the Web View container.

An example is described below in connection with FIG. 6.

Figure 6:
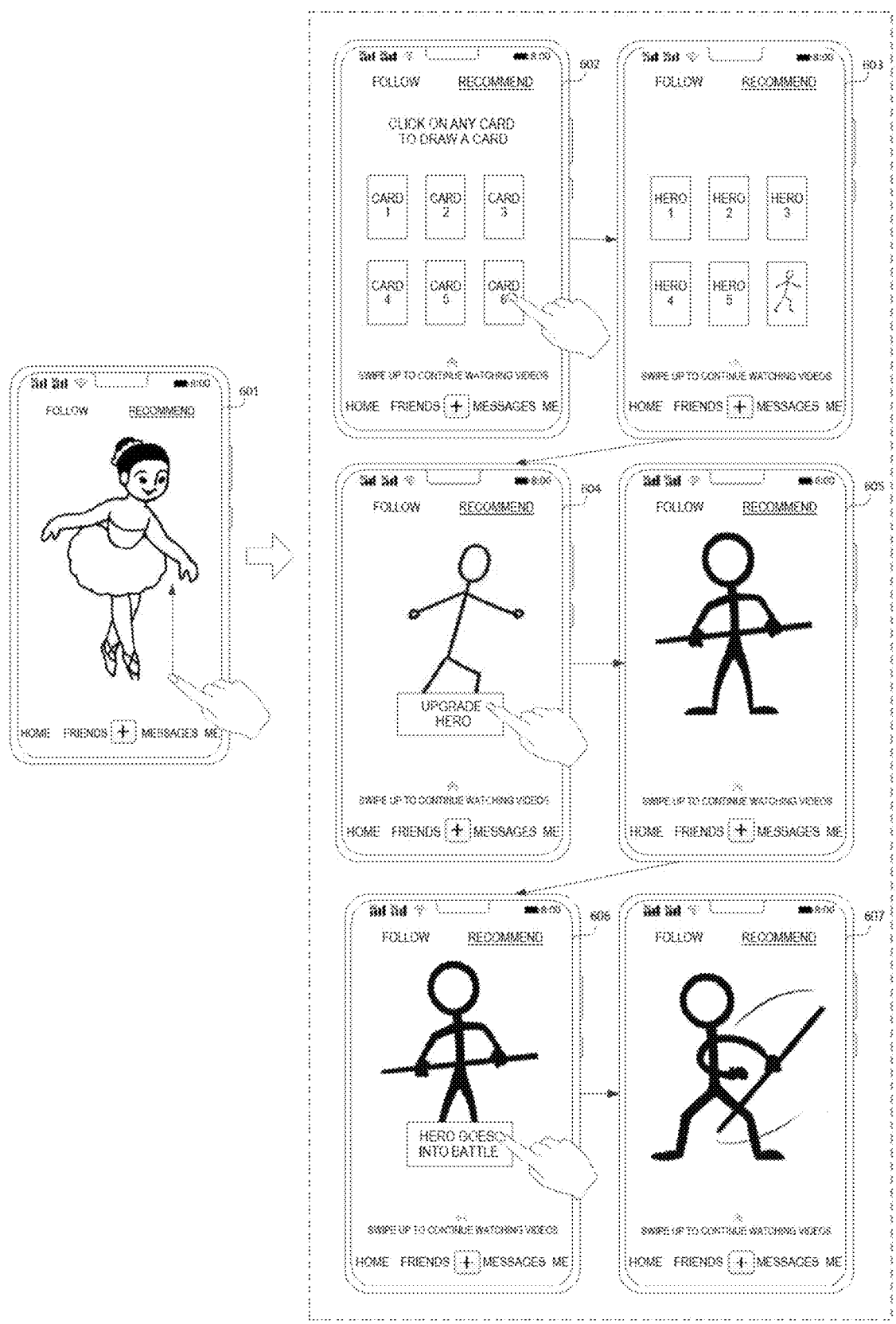
FIG. 6 is a schematic diagram of another feed flow display scenario according to the embodiments of the present disclosure.

FIG. 6 is a schematic diagram of another feed flow display scenario according to the embodiments of the present disclosure. As shown in FIG. 6, it is assumed that the feed flow interface is currently displaying a certain video in the feed flow, as shown in Interface 601. After the user inputs a predetermined swipe operation (e.g., a swipe-up operation) in the interface 601, the terminal device determines the next feed flow element in the feed flow as the second feed flow element. Assuming that the type of the second feed flow element is the interactive type, and the interactive content recommended by the second feed flow element is a Game X, the terminal device displays an interaction process shown in the interfaces 602 to the interface 607 in the feed flow interface.

In the example shown in FIG. 6, it is assumed that the interactive materials of the Game X includes three interactive trigger elements and an interactive result element corresponding to each interactive trigger element.

Refer to the interface 602 and the interface 603, which illustrate the first interaction triggering material of Game X, and the interaction process formed by the interaction operation input by the user for the first interaction triggering material. In interface 602, the first interaction triggering element is displayed in the interactive page layer via the Web View container. For example, taking a scene of "Select Hero" in Game X as an example, a plurality of cards is displayed in the interface 602, and each card corresponds to a hero, prompting the user to click on one of the cards to select a hero. It is assumed that the user inputs the click operation against a Card 6. After the terminal device detects the click operation input by the user for the Card 6, the interaction result material corresponding to the first interaction triggering material is displayed in the interactive page layer via the Web View container, as shown in the interface 603. For example, in the interaction result material, each card may be flipped to present a hero identifier corresponding to each card, and display a hero image corresponding to the card selected by the user.

Refer to interface 604 and interface 605, which illustrate the second interaction triggering material of Game X and the interaction process formed by the interaction operation input by the user for the second interaction triggering material. In interface 604, the second interaction triggering material is displayed in the interactive page layer via the Web View container. Taking a scene of "Upgrade Hero" in Game X as an example, the hero image selected by the user and a "Upgrade Hero" control are displayed in the interface 604. After the terminal device detects the click operation input by the user for the "Upgrade Hero" control, the interaction result material corresponding to the second interaction triggering material is displayed in the interactive page layer via the Web View container, as shown in the interface 605. For example, an image of the upgraded hero may be present in the interaction result material.

Refer to interface 606 and interface 607, which illustrate the third interaction triggering material of Game X and the interaction process formed by the interaction operation input by the user for the third interaction triggering material. In the interface 606, the third interaction triggering material is displayed in the interactive page layer via the Web View container. Taking a scene of "Hero Goes into Battle" in Game X as an example, the image of the hero upgraded by the user and the "Hero Goes into Battle" control are displayed in the interface 606. After the terminal device detects the click operation input by the user for the "Hero Goes into Battle" control, the interaction result material corresponding to the third interaction triggering material is displayed in the interactive page layer via the Web View container, as shown in the interface 607. For example, a scene where the upgraded hero is fighting may be presented in the interaction result material.

It should be understood that the interfaces 602, 604, and 606 illustrate a certain image frame of the interaction triggering material respectively, and interfaces 603, 605, and 607 illustrate a certain image frame of the interaction result material respectively.

Optionally, during the process of displaying the above interaction process in the interactive page layer via the Web View container, a switching prompt component (e.g., the "Swipe up to continue watching a video" component in the above interfaces 602 to 607) may further be displayed in the interface component layer via the feed flow client for prompting the user that he or she can input a predetermined swipe operation to switch to display other feed flow elements at any time during the interaction process. Thus, if the user is not interested in the interaction process of Game X, he or she may input the swipe-up operation at any time to switch to display subsequent feed flow elements.

Optionally, after the interaction result material corresponding to the i-th interaction triggering material is displayed in the feed flow interface, a transition material between the i-th interaction triggering material and the (i+1)-th interaction triggering material may further be displayed in the feed flow interface. The transition material is used to connect the interaction result material corresponding to the i-th interaction triggering material and the (i+1)-th interaction triggering material, so as to provide better connectivity between pictures and contents of the entire interaction process.

The method for displaying a feed flow provided in the embodiments is applied to a terminal device. The terminal device comprises a feed flow client, a player container and a Web View container. The method comprises: presenting a feed flow interface; displaying, via the player container, a video content corresponding to a first feed flow element in the feed flow in the feed flow interface, a type of the first feed flow element being a video type; in response to detecting a predetermined swipe operation input by a user in the feed flow interface, determining, via the feed flow client, a second feed flow element to be displayed in the feed flow; in response to a type of the second feed flow element being an interactive type, loading, via the feed flow client, an interactive material of an interactive content recommended by the second feed flow element into the Web View container; displaying, via the Web View container, an interaction process of the interactive content in the feed flow interface, the interaction process presenting a process of the interactive material changing with an interaction operation input by the user, and the interaction process indicating an interaction process of using the interactive content. Through the above process, users can interact with the feed flow while browsing it, which enhances the interactivity of the feed flow. Furthermore, during browsing the feed flow, as it is not necessary to jump to a landing page, the user can directly try to play or try out the interactive content in the feed flow interface. By trying to play or trying out the interactive content, the user can gain a deeper understanding of it, which in turn can improve the content recommendation effect.

Figure 7:
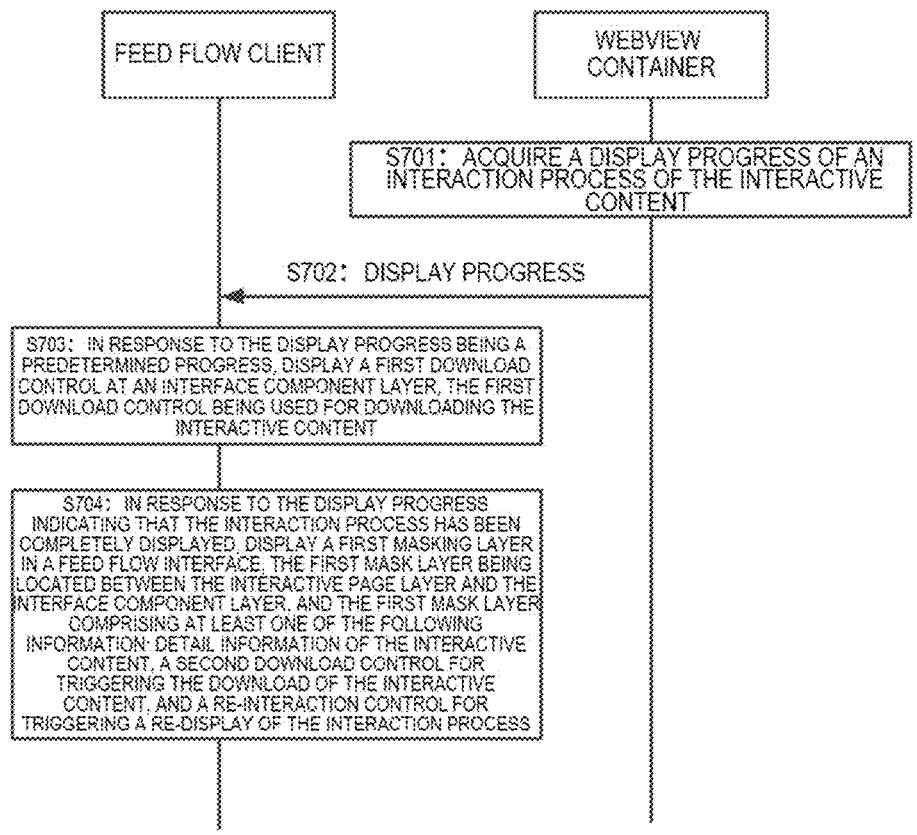
FIG. 7 is a flowchart of another method for displaying a feed flow according to the embodiments of the present disclosure.

FIG. 7 is a schematic flowchart of another method for displaying a feed flow according to the embodiments of the present disclosure. As shown in FIG. 7, the method of this embodiment includes:

S701: the Web View container acquires a display progress of an interaction process of the interactive content.

S702: the Web View container sends the display progress to the feed flow client.

The Web View container may acquire the display progress of the interaction process of the interactive content in real time/periodically. By way of example, a current display duration of the interaction process may be used as the display progress. For example, if the interaction process has been displayed for 3s at the current time instant, the display progress is determined to be 3s. By way of example, the display progress may also be determined based on the interactive material currently being displayed. For example, if the interactive content includes 6 interactive materials in total, and the second interactive material is currently being displayed, the display progress is determined to be ⅓.

After determining the display progress, the Web View container provides the display progress to the feed flow client. The feed flow client performs S703 or S704 according to the display progress.

S703: in response to the display progress being a predetermined progress, the feed flow client displays a first download control at an interface component layer, the first download control being used for downloading the interactive content.

Figure 8:
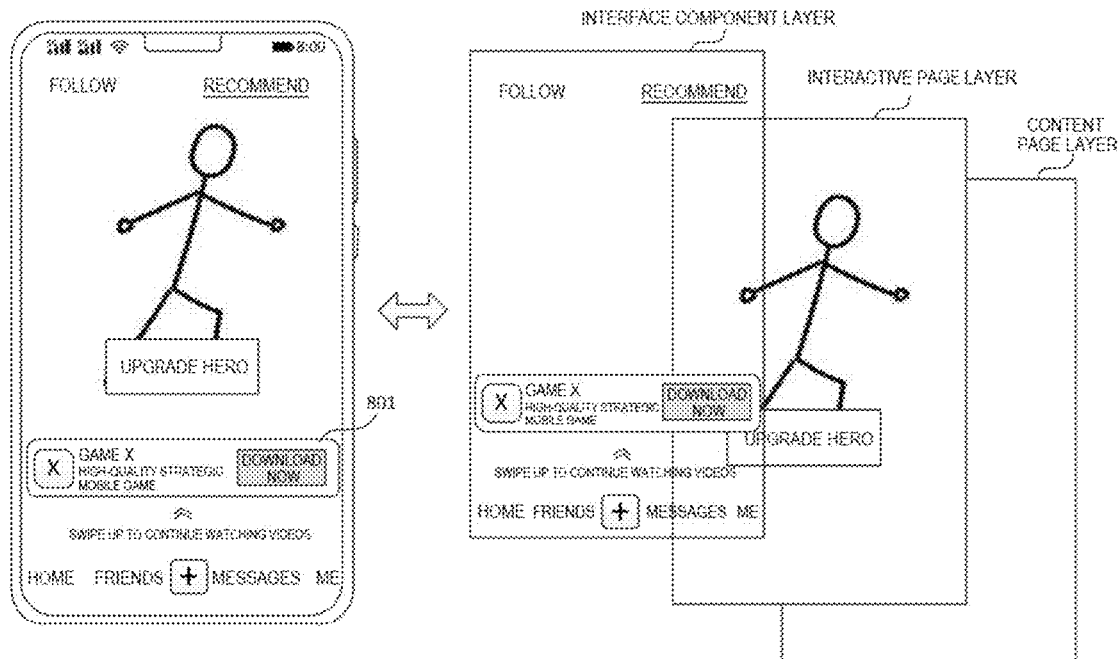
FIG. 8 is a schematic diagram of yet another feed flow interface provided by the embodiments of the present disclosure.

An example is described in connection with FIG. 6. It is assumed that the predetermined progress refers to that the display duration of the interaction process reaches 5s. The display time instant of the terminal device at interface 604, the feed flow client determines, based on the display progress provided by the Web View container, that the display progress reaches the predetermined progress, and then displays the first download control on the interface component layer of the interface 604. As an example, FIG. 8 is a schematic diagram of another feed flow interface according to the embodiments of the present disclosure. As shown in FIG. 8, the first download control 801 is displayed in a feed flow interface. The first download control 801 is displayed in the interface component layer. It should be understood that the first download control 801 is displayed in the interface component layer during the display process of the interaction process after the interface 604. In response to detecting the click operation input by the user for the first download control 801, the terminal device acquires the download path of the interactive content, and downloads the interactive content according to the download path.

As such, by displaying the first download control on the interface component layer, the user can click the first download control at any time during the process of trying to play the interactive content in the feed flow interface, so as to download the interactive content, thereby improving the convenience of the user's download operation.

S704: in response to the display progress indicating that the interaction process has been completely displayed, the feed flow client displays a first masking layer in a feed flow interface, the first mask layer being located between the interactive page layer and the interface component layer, and the first mask layer comprising at least one of the following information: detail information of the interactive content, a second download control for triggering the download of the interactive content, and a re-interaction control for triggering a re-display of the interaction process.

The mask layer may be understood as a layer with a transparency smaller than or equal to a predetermined threshold value. In a case where the transparency of the mask layer is relatively low, the content of the picture behind the mask layer can be vaguely seen through the mask layer.

Figure 9:
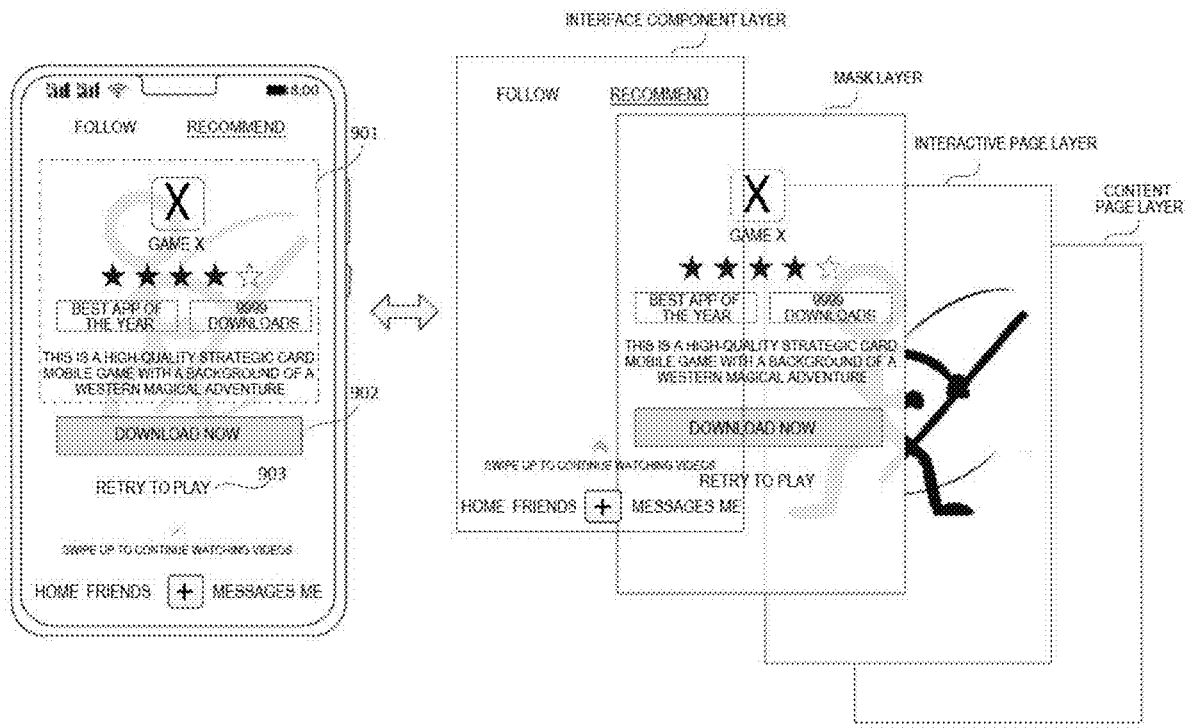
FIG. 9 is a schematic diagram of yet another feed flow interface provided by the embodiments of the present disclosure.

As an example, FIG. 9 is a schematic diagram of another feed flow interface according to the embodiments of the present disclosure. After the display of the interaction process of the interactive content is finished, the interactive page layer presents the last frame of the interaction process, and the first mask layer may be displayed between the interactive page layer and the interface component layer.

Continuing to refer to FIG. 9, detailed information 901 of the interactive content may be displayed in the first mask layer, such as, the name of the interactive content (e.g., Program X), the historical number of people who have downloaded the interactive content (e.g., 9999 people have downloaded), the historical comment information of the interactive content (e.g., Best App of the year), feature information of the interactive content (e.g., a high-quality strategy card game with a background of a Western magic adventure), and so on. By means of the above-described detailed information 901, the user's understanding of the interactive content can be further deepened, and the user's willingness to download the interactive content can be strengthened.

Continuing to refer to FIG. 9, a second download control 902 for triggering the download of the interactive content may further be displayed in the first mask layer. The user may click the second download control 902. In response to detecting a click operation input by the user for the second download control 902, the terminal device acquires the download path of the interactive content and downloads the interactive content according to the download path.

Continuing to refer to FIG. 9, a re-interaction control 903 for triggering the re-display of the interaction process may further be displayed in the first mask layer. Thus, if the user wants to retry to play the interactive content, he or she can click the re-interaction control 903. In response to detecting a click operation input by the user for the re-interaction control 903, the terminal device re-displays the interaction process of the interactive content in the feed flow interface. By providing a retry function, the user can fully experience the interaction process of using the interactive content, which deepens the user's understanding of the interactive content and enhances the user's willingness to download the interactive content.

On the basis of any of the above embodiments, during the interaction process of the interactive content is displayed in the feed flow interface, the operational state of the Web View container may be monitored via the feed flow client, to determine whether a page displayed in the Web View state is stuck, lagged, or the like.

Figure 10:
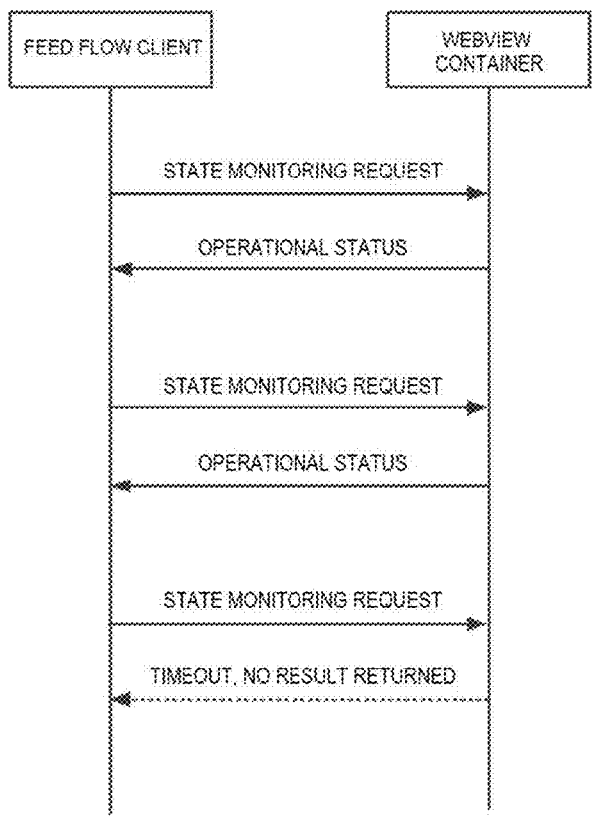
FIG. 10 is a schematic diagram of a monitoring process of a Web View container according to the embodiments of the present disclosure.

FIG. 10 is a schematic diagram of a monitoring process of a Web View container according to the embodiments of the present disclosure. As shown in FIG. 10, the feed flow client may periodically send a state monitoring request to the Web View container. After receiving the state monitoring request, the Web View container feeds back its operational state to the feed flow client. If the operational state received by the feed flow client is an abnormal state, or if the feed flow client does not receive the operational state within a predetermined duration, the operational state of the Web View container is determined to be the abnormal state.

In this embodiment, in response to the operational state of the Web View container being monitored as an abnormal state, performing one of the following:

(1) displaying a second mask layer in the feed flow interface via the feed flow client, the second mask layer being located between the interactive page layer and the interface component layer, the second mask layer comprising at least one of the following information: detail information of the interactive content, a second download control for triggering the download of the interactive content, and a re-interaction control for triggering a re-display of the interaction process. It should be understood that the display effect of the second mask layer is similar to that shown in FIG. 9, and thus will not be repeated herein.

(2) controlling, via the feed flow client, the Web View container to display a next interaction triggering material in the interactive page layer. That is to say, when the interaction triggering material of a scene is stuck or lagging, the Web View container may be controlled to display the interaction triggering material of the next scene, thereby improving the user's interactive experience.

The above embodiments describe a process of displaying the interaction process of the interactive content via the Web View container. On the basis of any of the above embodiments, in some possible implementations, the interactive material of interactive content may be pre-rendered via the feed flow client, which may reduce a display delay of the interaction process and improve the interactive effect. The pre-rendering process of an interactive material is described below in connection with FIG. 11.

Figure 11:
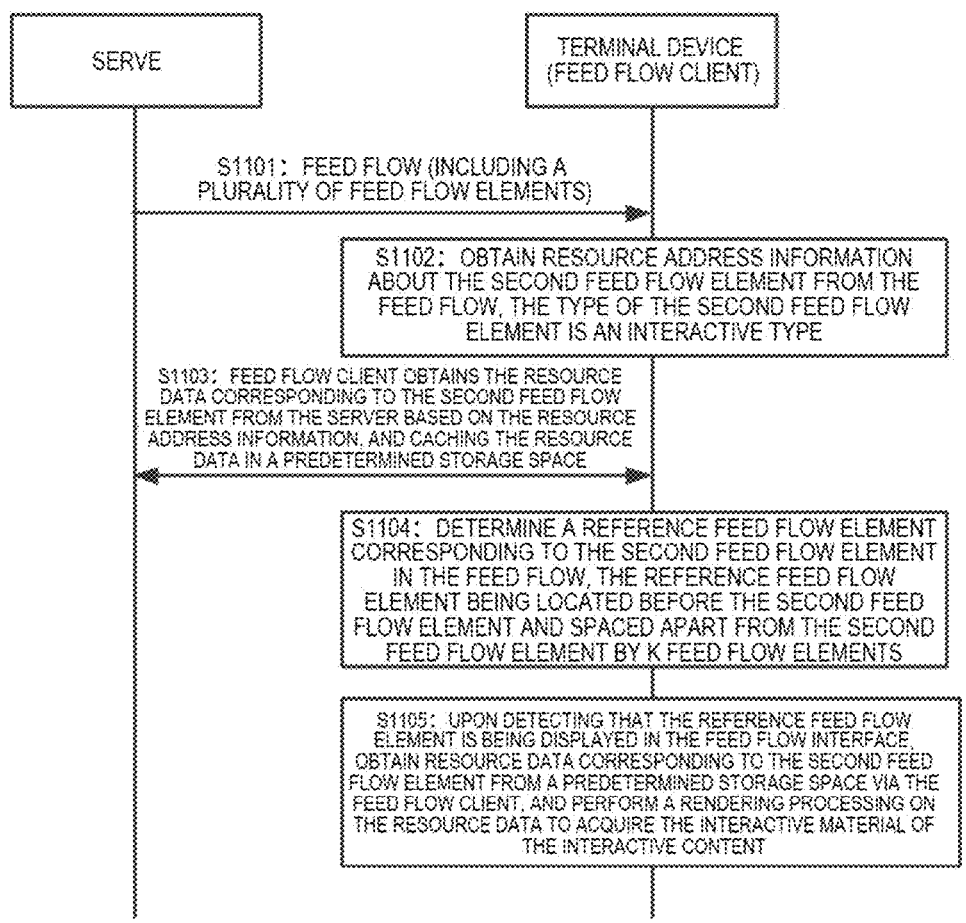
FIG. 11 is a schematic diagram of a pre-rendering process of an interactive material according to the embodiments of the present disclosure.

FIG. 11 is a schematic diagram of a pre-rendering process of an interactive material according to the embodiments of the present disclosure. As shown in FIG. 11, the method of this embodiment comprises:

S1101: a server sends a feed flow to a feed flow client, where the feed flow includes a plurality of feed flow elements.

In an example, the server may proactively push the feed flow to the feed flow client. In another example, the server may send the feed flow to the feed flow client according to a recommendation request sent by the feed flow client.

S1102: a feed flow client obtains resource address information about the second feed flow element from the feed flow, wherein the type of the second feed flow element is an interactive type.

A part of the feed flow elements in the feed flow are of the video type, and another part of the feed flow elements are of the interactive type. For the second feed flow element of the interactive type, the feed flow client obtains resource address information about the second feed flow element from the feed flow. The resource address information is used for indicating a storage address of resource data corresponding to the second feed flow element in a server, and the resource data comprises: data required for rendering the interactive material, data required for rendering the first download component, data required for rendering the first mask layer/second mask layer, and so on.

S1103: the feed flow client obtains the resource data corresponding to the second feed flow element from the server based on the resource address information, and caching the resource data in a predetermined storage space.

In this embodiment, after the feed flow client obtains the feed flow from the server, if the second feed flow element of the interactive type presents in the feed flow, the resource data corresponding to the second feed flow element is pre-loaded locally. In this way, the display delay of the interaction process can be reduced, and the interactive effect can be improved.

S1104: the feed flow client determines a reference feed flow element corresponding to the second feed flow element in the feed flow, the reference feed flow element being located before the second feed flow element and spaced apart from the second feed flow element by K feed flow elements. K is an integer greater than or equal to 0.

S1105: upon detecting that the reference feed flow element is being displayed in the feed flow interface, obtaining resource data corresponding to the second feed flow element from a predetermined storage space via the feed flow client, and performing a rendering processing on the resource data to acquire the interactive material of the interactive content.

In this embodiment, the display time instant of the reference feed flow element indicates the rendering time instant of the second feed flow element. For example, assuming that the second feed flow element is the x-th feed flow element in the feed flow, the (x-K-1)-th feed flow element in the feed flow may be determined as the reference feed flow element. When it is detected that a user is browsing the (x-K-1)-th feed flow element, rendering processing of the resource data corresponding to the x-th feed flow element is started to obtain the interactive material of the interactive content.

Optionally, in addition to pre-rendering to obtain the interactive material of the interactive content, the first download component, the first mask, the second mask, and the like may also be pre-rendered. In this way, when the first download component, the first mask and the second mask need to be displayed, the interaction delay can be further reduced.

Optionally, the feed flow client may obtain a predetermined pre-rendering strategy from the server, and determine, according to the pre-rendering strategy, a reference feed flow element corresponding to the second feed flow element in the feed flow. The pre-rendering strategy is used to indicate a pre-rendering occasion of the second feed flow element, for example, pre-rendering is performed in advance of several feed flow elements.

It should be understood that, after obtaining the interactive materials of the interactive content by rendering, the feed flow client may cache the interactive materials. In the process of the user browsing the feed flow, when it is detected that the second feed flow element needs to be displayed, a pre-rendered interactive material is obtained from a cache, the interactive material is loaded into the Web View container, and the interaction process of the interactive content is displayed via the Web View container. This part may refer to the detailed description of the foregoing embodiments.

Figure 12:
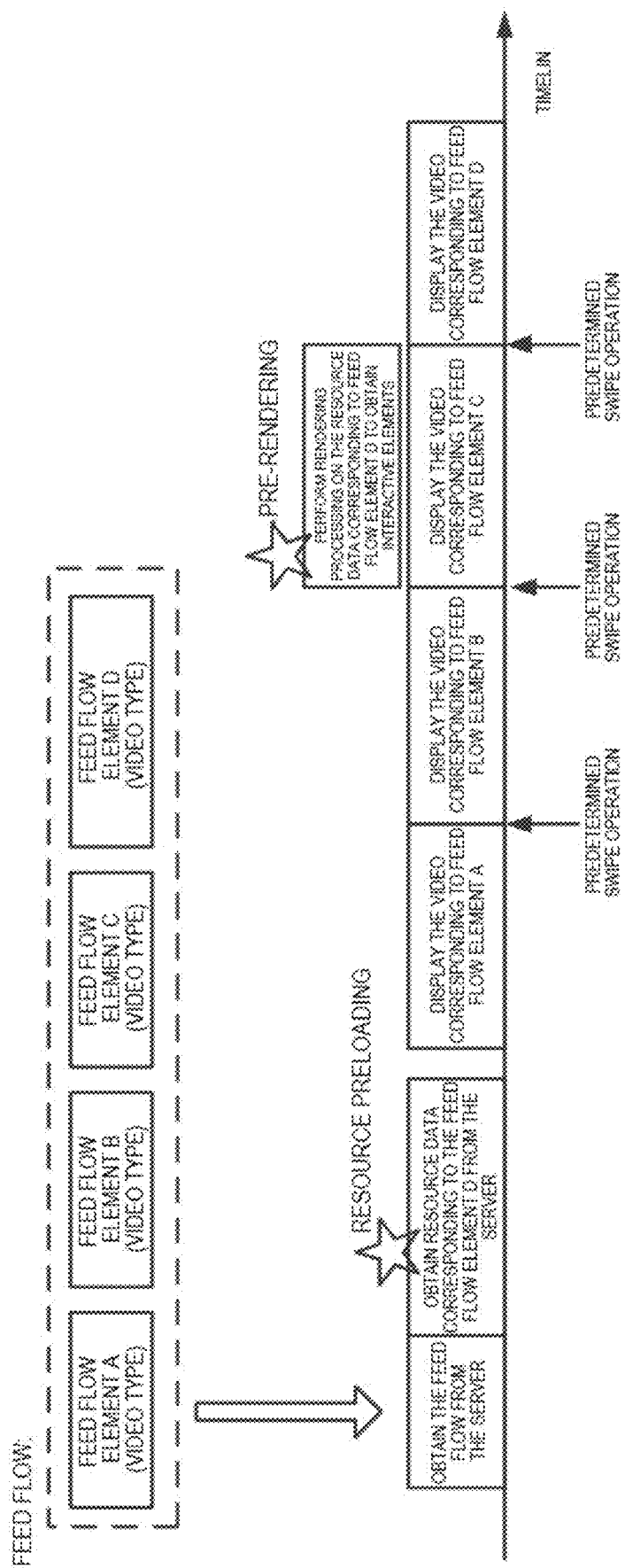
FIG. 12 is a schematic diagram of a process of displaying a feed flow according to the embodiments of the present disclosure.

As an example, FIG. 12 is a schematic diagram of a process of displaying a feed flow according to the embodiments of the present disclosure. It is assumed that the feed flow includes four feed flow elements, i.e., feed flow elements A, B, C, and D. The feed flow element D is of the interactive type, and the other feed flow elements are of the video type. As shown in FIG. 12, the process of displaying the feed flow includes:
(1) after receiving the above-described five feed flow elements from the server, the terminal device determines that the feed flow element D is of the interactive type, and obtains the resource data (i.e., a resource preloading process) corresponding to the feed flow element D from the server, and stores it in a local predetermined storage space. Assuming that the prerendering strategy indicates that prerendering is performed for one feed flow element in advance, the terminal device determines that when it is detected that the user browses the feed flow element C, rendering processing is performed for the resource data corresponding to the feed flow element D.
(2) after detecting a predetermined swipe operation input by the user in the feed flow interface, displaying a video corresponding to the feed flow element A in the feed flow interface via the feed flow client.
(3) after detecting the predetermined swipe operation input by the user in the feed flow interface, displaying a video corresponding to the feed flow element B in the feed flow interface via the feed flow client.
(4) after detecting the predetermined swipe operation input by the user in the feed flow interface, displaying a video corresponding to the feed flow element C in the feed flow interface via the feed flow client, and the video picture is displayed in the content page layer. Furthermore, resource data corresponding to the feed flow element D is obtained from a predetermined storage space by the feed flow client, and the rendering processing is performed for resource data to obtain the interactive material of the interactive content.
(5) after detecting the predetermined swipe operation input by the user in the feed flow interface, adding an interactive page layer between the content picture layer and the interface component layer via the feed flow client, and displaying the interaction process of the interactive content in the interactive page layer by using the pre-rendered interactive material via the Web View container.

In this embodiment, by preloading the resource data corresponding to the second feed flow element, and pre-rendering the interactive material of the interactive content, the display delay of the interaction process can be reduced, and the user's trying-to-play/trying-out experience of the interactive content can be improved.

Figure 13:
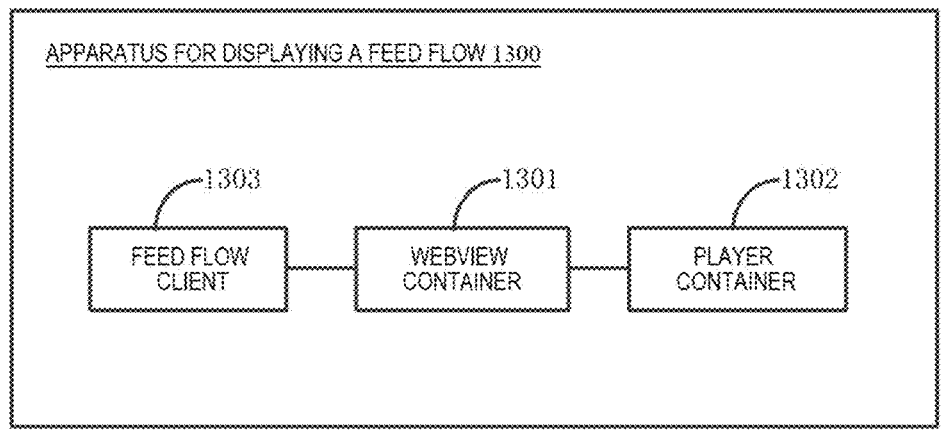
FIG. 13 is a structural diagram of an apparatus for displaying a feed flow according to the embodiments of the present disclosure.

FIG. 13 is a structural diagram of an apparatus for displaying a feed flow according to the embodiments of the present disclosure. As shown in FIG. 13, the apparatus 1300 for displaying the feed flow provided in embodiments comprises: a feed flow client 1301, a Web View container 1302, and a player container 1303; wherein,
the player container 1303 is configured to display a video content corresponding to a first feed flow element in the feed flow in the feed flow interface, wherein a type of the first feed flow element is a video type;
the feed flow client 1301 is configured to determine a second feed flow element to be displayed in the feed flow in response to detecting a predetermined swipe operation input by a user in the feed flow interface;
the feed flow client 1301 is further configured to, in response to a type of the second feed flow element being an interactive type, load an interactive material of an interactive content recommended by the second feed flow element into the Web View container;
The Web View container 1302 is configured to display an interaction process of the interactive content in the feed flow interface, the interaction process presenting a process of the interactive material changes with an interaction operation input by the user, and the interaction process indicating an interaction process of using the interactive content.

According to one or more embodiments of the present disclosure, the feed flow client 1301 is further configured to add an interactive page layer between a content page layer and an interface component layer of the feed flow interface; wherein the content page layer is used for displaying a video picture of a feed flow element of a video type, and a size of the interactive page layer is the same as a size of the content page layer;
The Web View container 1302 is specifically configured to display the interaction process in the interactive page layer.

According to one or more embodiments of the present disclosure, the interactive material of the interactive content comprises M interaction triggering materials and interaction result materials corresponding to the respective interaction triggering materials, and M is an integer greater than or equal to 1; The Web View container 1302 is specifically configured to:

displaying an i-th interaction triggering material in the interactive page layer;

in response to detecting an interaction operation input by the user for the i-th interaction triggering material, displaying an interaction result material corresponding to the i-th interaction triggering material in the interactive page layer;

wherein i is equal to 1, 2, . . . , M in turn.

According to one or more embodiments of the present disclosure, the Web View container 1302 is further configured to acquire a display progress of the interaction process; The feed flow client 1301 is further configured to:

in response to the display progress being a predetermined progress, display a first download control at the interface component layer, the first download control being used for downloading the interactive content; or, in response to the display progress indicating that the interaction process has been completely displayed, display a first mask layer in the feed flow interface, the first mask layer being located between the interactive page layer and the interface component layer, and the first mask layer comprising at least one of the following information: detail information of the interactive content, a second download control for triggering the download of the interactive content, and a re-interaction control for triggering a re-display of the interaction process.

According to one or more embodiments of the present disclosure, the feed flow client 1301 is further configured to:

monitor an operational state of the Web View container;

in response to the operational state of the Web View container being monitored as an abnormal state, perform one of the following:

display a second mask layer in the feed flow interface, the second mask layer being located between the interactive page layer and the interface component layer, the second mask layer comprising at least one of the following information: detail information of the interactive content, a second download control for triggering the download of the interactive content, and a re-interaction control for triggering a re-display of the interaction process; or, control the Web View container to display a next interaction triggering material in the interactive page layer.

According to one or more embodiments of the present disclosure, the feed flow client 1301 is further configured to:

determine a reference feed flow element corresponding to the second feed flow element in the feed flow, the reference feed flow element being located before the second feed flow element and spaced apart from the second feed flow element by K feed flow elements, K being an integer greater than or equal to 0;

in response to detecting that the reference feed flow element is being displayed in the feed flow interface, obtain resource data corresponding to the second feed flow element, and performing a rendering processing on the resource data to acquire the interactive material of the interactive content.

According to one or more embodiments of the present disclosure, the feed flow client 1301 is further configured to:

receive the information feed from a server;

obtaining resource address information about the second feed flow element from the feed flow;

obtaining the resource data corresponding to the second feed flow element from the server based on the resource address information, and caching the resource data in a predetermined storage space;

The feed flow client 1301 is specifically configured to obtain the resource data corresponding to the second feed flow element from the predetermined storage space, and performing the rendering processing on the resource data to acquire the interactive material of the interactive content.

According to one or more embodiments of the present disclosure, the interactive content is an application or a web program.

The apparatus for displaying a feed flow provided by the embodiments may be used to perform the method for displaying the feed flow provided by any of the above method embodiments, and the implementation principles and technical effects thereof are similar, and will not be repeated herein.

To implement the above embodiments, the embodiments of the present disclosure also provide an electronic device.

Figure 14:
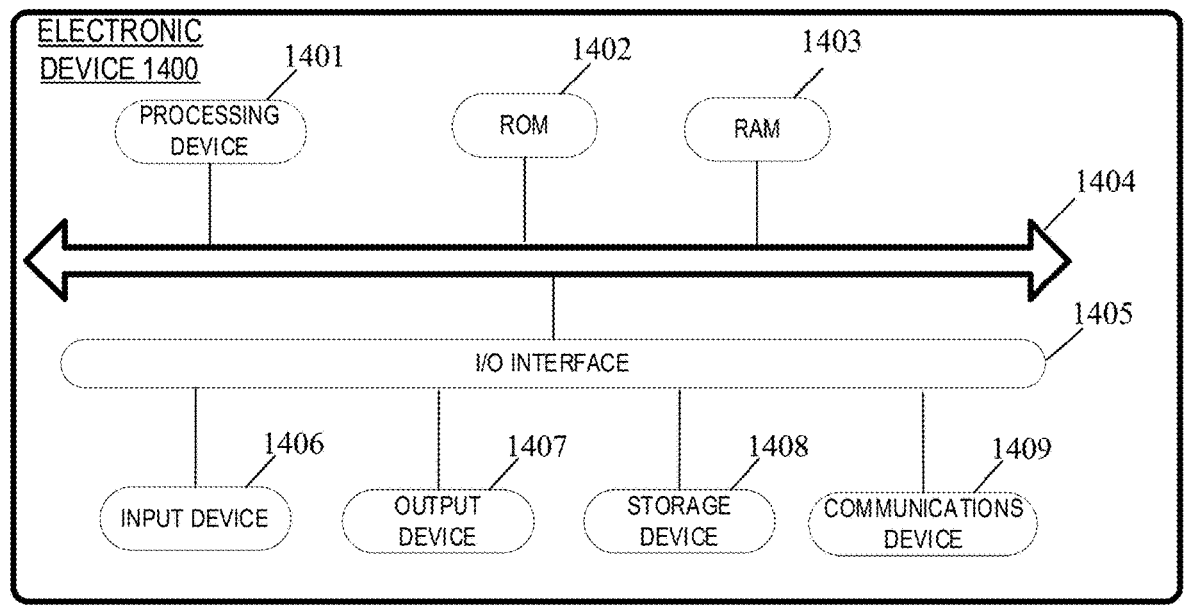
FIG. 14 is a structural diagram of an electronic device provided by embodiments of the present disclosure.

Referring to FIG. 14, which illustrates a structural diagram of an electronic device 1400 suitable for implementing embodiments of the present disclosure. The electronic device 1400 may be a terminal device or a server. The terminal device may include, but is not limited to, mobile terminals such as mobile phones, laptops, digital broadcast receivers, personal digital assistants (PDA), portable android device (PAD), portable media players (PMP), in-car terminals (e.g., in-car navigation terminals) and the like, and fixed terminals such as digital TVs, desktop computers and the like. The electronic device shown in FIG. 14 is merely an example and should not impose any limitation on the functions and scope of use of the embodiments of the present disclosure.

As shown in FIG. 14, the electronic device 1400 may include a processing device (e.g., a central processing unit, a graphics processing unit, etc.) 1401 that may perform various suitable actions and processes in accordance with a program stored in read only memory (ROM) 1402 or a program loaded into random access memory (RAM) 1403 from storage device 1408. In the RAM 1403, various programs and data necessary for the operation of the electronic device 1400 are also stored. The processing device 1401, the ROM 1402, and the RAM 1403 are connected to each other via a bus 1404. An input/output (I/O) interface 1405 is also connected to the bus 1404.

In general, the following apparatus may be connected to the I/O interface 1405: an input device 1406 including, for example, a touch screen, a touch pad, a keyboard, a mouse, a camera, a microphone, an accelerometer, a gyroscope, or the like; an output device 1407 including, for example, a liquid crystal display (LCD), a speaker, a vibrator, or the like; a storage device 1408 including, for example, a magnetic tape, a hard disk, or the like; and a communication device 1409. The communication device 1409 may allow electronic device 1400 to communicate wirelessly or wired with other devices to exchange data. While FIG. 14 illustrates an electronic device 1430 with a variety of component, it should be understood that it is not required that all of the illustrated components be implemented or provided. More or fewer components may alternatively be implemented or provided.

In particular, the processes described above with reference to the flowcharts may be implemented as computer software programs in accordance with embodiments of the present disclosure. For example, embodiments of the present disclosure include a computer program product comprising a computer program carried on a computer readable medium. The computer program comprises a program code for executing the method as shown in the flowchart. In such an embodiment, the computer program may be downloaded and installed from the network via communications device 1409, or installed from storage device 1408, or installed from ROM 1402. When the computer program is executed by the processing device 1401, the above-described functions defined in the method of embodiments of the present disclosure are executed.

It should be noted that the computer readable medium in the present disclosure may be a computer readable signal medium or a computer readable storage medium, or any combination thereof. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain or store a program for use by or in connection with an instruction execution system, apparatus, or device. While in the present disclosure, a computer readable signal medium may include a propagated data signal with computer readable program code embodied therein, for example, in baseband or as part of a carrier wave. Such a propagated signal may take any of a variety of forms, including, but not limited to, electromagnetic signal, optical signal, or any suitable combination thereof. A computer readable signal medium may also be any computer readable medium that is not a computer readable storage medium and that can transmit, propagate, or transport a program for use by or in connection with an instruction execution system, apparatus, or device. Program code embodied on a computer readable medium may be transmitted using any appropriate medium, including, but not limited to, wireline, optical fiber cable, radio frequency (RF), etc., or any suitable combination of the foregoing.

The above-described computer-readable medium may be included in the electronic device; or it may stand alone and not be assembled into such electronic device.

The above-described computer-readable medium carries one or more programs, and the one or more programs, when executed by the electronic device, causes the electronic device to perform the methods shown in the above embodiments.

Computer program code for carrying out operations for aspects of the present disclosure may be written in any combination of one or more programming languages, including an object oriented programming language such as Java, Smalltalk, C++ or the like and conventional procedural programming languages, such as the 'C' programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, a program segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart, and combinations of blocks in the block diagrams and/or flowchart, can be implemented by special purpose hardware-based systems that perform the specified functions or acts, or combinations of special purpose hardware and computer instructions.

The units involved in the embodiments of the present disclosure may be implemented in software, or in hardware. The names of the units do not limit the units themselves in some cases; for example, the first obtaining unit may also be described as "a unit for obtaining at least two Internet Protocol addresses."

The functions described herein above may be performed, at least in part, by one or more hardware logic components. For example, without limitation, exemplary types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), etc.

In a first aspect, according to one or more embodiments of the present disclosure, a method for displaying a feed flow is provided, which is applied to a terminal device. The terminal device comprises: a feed flow client, a player container, and a Web View container. The method comprises:

presenting a feed flow interface;

displaying, via the player container, a video content corresponding to a first feed flow element in the feed flow in the feed flow interface, a type of the first feed flow element being a video type;

in response to detecting a predetermined swipe operation input by a user in the feed flow interface, determining, via the feed flow client, a second feed flow element to be displayed in the feed flow;

in response to a type of the second feed flow element being an interactive type, loading, via the feed flow client, an interactive material of an interactive content recommended by the second feed flow element into the Web View container;

displaying, via the Web View container, an interaction process of the interactive content in the feed flow interface, the interaction process presenting a process of the interactive material changing with an interaction operation input by the user, and the interaction process indicating an interaction process of using the interactive content.

According to one or more embodiments of the present disclosure, the method further comprises: before displaying the interaction process of the interactive content in the feed flow interface via the Web View container, adding an interactive page layer between a content page layer and an interface component layer of the feed flow interface via the feed flow client; wherein the content page layer is used for displaying a video picture of a feed flow element of a video type, and a size of the interactive page layer is the same as a size of the content page layer;

the displaying an interaction process of the interactive content in the feed flow interface via the Web View container comprises:

displaying the interaction process in the interactive page layer via the Web View container.

According to one or more embodiments of the present disclosure, the interactive material of the interactive content comprises M interaction triggering materials and interaction result materials corresponding to the respective interaction triggering materials, and M is an integer greater than or equal to 1;

the displaying the interaction process in the interactive page layer via the Web View container comprises:

displaying an i-th interaction triggering material in the interactive page layer via the Web View container;

in response to detecting an interaction operation input by the user for the i-th interaction triggering material, displaying an interaction result material corresponding to the i-th interaction triggering material in the interactive page layer via the Web View container;

wherein i is equal to 1, 2, . . . , M in turn.

According to one or more embodiments of the present disclosure, the method further comprises:

acquiring a display progress of the interaction process via the Web View container;

in response to the display progress being a predetermined progress, displaying a first download control at the interface component layer via the feed flow client, the first download control being used for downloading the interactive content; or, in response to the display progress indicating that the interaction process has been completely displayed, displaying a first mask layer in the feed flow interface via the feed flow client, the first mask layer being located between the interactive page layer and the interface component layer, and the first mask layer comprising at least one of the following information: detail information of the interactive content, a second download control for triggering the download of the interactive content, and a re-interaction control for triggering a re-display of the interaction process.

According to one or more embodiments of the present disclosure, the method further comprises:

monitoring, via the feed flow client, an operational state of the Web View container;

in response to the operational state of the Web View container being monitored as an abnormal state, performing one of the following:

displaying a second mask layer in the feed flow interface via the feed flow client, the second mask layer being located between the interactive page layer and the interface component layer, the second mask layer comprising at least one of the following information: detail information of the interactive content, a second download control for triggering the download of the interactive content, and a re-interaction control for triggering a re-display of the interaction process; or, controlling, via the feed flow client, the WebView container to display a next interaction triggering material in the interactive page layer.

According to one or more embodiments of the present disclosure, the method further comprises: before loading, via the feed flow client, the interactive material of the interactive content recommended by the second feed flow element into the Web View container:

determining, via the feed flow client, a reference feed flow element corresponding to the second feed flow element in the feed flow, the reference feed flow element being located before the second feed flow element and spaced apart from the second feed flow element by K feed flow elements, K being an integer greater than or equal to 0;

in response to detecting that the reference feed flow element is being displayed in the feed flow interface, obtaining resource data corresponding to the second feed flow element, and performing a rendering processing on the resource data via the feed flow client to acquire the interactive material of the interactive content.

According to one or more embodiments of the present disclosure, the method further comprises:

receiving, via the feed flow client, the feed flow from a server;

obtaining, via the feed flow client, resource address information about the second feed flow element from the feed flow;

obtaining, via the feed flow client, the resource data corresponding to the second feed flow element from the server based on the resource address information, and caching the resource data in a predetermined storage space;

obtaining resource data corresponding to the second feed flow element, and performing a rendering processing on the resource data via the feed flow client to acquire the interactive material of the interactive content comprises:

obtaining, via the feed flow client, the resource data corresponding to the second feed flow element from the predetermined storage space, and performing the rendering processing on the resource data to acquire the interactive material of the interactive content.

According to one or more embodiments of the present disclosure, the interactive content is an application program or a web program.

In a second aspect, according to one or more embodiments of the present disclosure, an apparatus for displaying a feed flow is provided, the apparatus comprising: a feed flow client, a player container and a Web View container; wherein, the player container is configured to display a video content corresponding to a first feed flow element in the feed flow in the feed flow interface, wherein a type of the first feed flow element is a video type;

the feed flow client is configured to determine a second feed flow element to be displayed in the feed flow in response to detecting a predetermined swipe operation input by a user in the feed flow interface;

the feed flow client is further configured to, in response to a type of the second feed flow element being an interactive type, load an interactive material of an interactive content recommended by the second feed flow element into the Web View container;

the Web View container is configured to display an interaction process of the interactive content in the feed flow interface, the interaction process presenting a process of the interactive material changes with an interaction operation input by the user, and the interaction process indicating an interaction process of using the interactive content.

According to one or more embodiments of the present disclosure, the feed flow client is further configured to add an interactive page layer between a content page layer and an interface is used for displaying a video picture of a feed flow element of a video type, and a size of the interactive page layer is the same as a size of the content page layer; and the Web View container is specifically configured to display the interaction process in the interactive page layer.

According to one or more embodiments of the present disclosure, the interactive material of the interactive content comprises M interaction triggering materials and interaction result materials corresponding to the respective interaction triggering materials, and M is an integer greater than or equal to 1; The Web View container is specifically configured to:

display an i-th interaction triggering material in the interactive page layer;

in response to detecting an interaction operation input by the user for the i-th interaction triggering material, displaying an interaction result material corresponding to the i-th interaction triggering material in the interactive page layer;

wherein i is equal to 1, 2, . . . , M in turn.

According to one or more embodiments of the present disclosure, the Web View container is further configured to acquire a display progress of the interaction process; the feed flow client is further configured to:

in response to the display progress being a predetermined progress, display a first download control at the interface component layer, the first download control being used for downloading the interactive content; or, in response to the display progress indicating that the interaction process has been completely displayed, display a first mask layer in the feed flow interface, the first mask layer being located between the interactive page layer and the interface component layer, and the first mask layer comprising at least one of the following information: detail information of the interactive content, a second download control for triggering the download of the interactive content, and a re-interaction control for triggering a re-display of the interaction process.

According to one or more embodiments of the present disclosure, the feed flow client is further configured to:

monito an operational state of the Web View container;

in response to the operational state of the Web View container being monitored as an abnormal state, performing one of the following:

displaying a second mask layer in the feed flow interface, the second mask layer being located between the interactive page layer and the interface component layer, the second mask layer comprising at least one of the following information: detail information of the interactive content, a second download control for triggering the download of the interactive content, and a re-interaction control for triggering a re-display of the interaction process; or, controlling the Web View container to display a next interaction triggering material in the interactive page layer.

According to one or more embodiments of the present disclosure, the feed flow client is further configured to:

determine a reference feed flow element corresponding to the second feed flow element in the feed flow, the reference feed flow element being located before the second feed flow element and spaced apart from the second feed flow element by K feed flow elements, K being an integer greater than or equal to 0;

in response to detecting that the reference feed flow element is being displayed in the feed flow interface, obtain resource data corresponding to the second feed flow element, and performing a rendering processing on the resource data to acquire the interactive material of the interactive content.

According to one or more embodiments of the present disclosure, the feed flow client is further configured to:

receive the information feed from a server;

obtain resource address information about the second feed flow element from the feed flow;

obtain the resource data corresponding to the second feed flow element from the server based on the resource address information, and caching the resource data in a predetermined storage space;

and the feed flow client is specifically configured to obtain the resource data corresponding to the second feed flow element from the predetermined storage space, and performing the rendering processing on the resource data to acquire the interactive material of the interactive content.

According to one or more embodiments of the present disclosure, the interactive content is an application program or a web program.

In a third aspect, according to one or more embodiments of the present disclosure, an electronic device is provided, the electronic device comprising: a processor and a memory;

the memory stores a computer execution instruction;

The processor executes the computer executable instructions to carry out the method for displaying a feed flow according to the first aspect and various possible designs of the first aspect.

According to a fourth aspect, according to one or more embodiments of the present disclosure, a computer readable storage medium is provided. The computer readable storage medium having computer executable instructions stored thereon, wherein the computer executable instructions, when executed by a processor, carry out the method for displaying a feed flow according to the first aspect and various possible designs of the first aspect.

According to a fifth aspect, according to one or more embodiments of the present disclosure, a computer program product is provided, the computer program product including a computer program, wherein the computer program, when executed by a processor, carry out the method for displaying a feed flow according to the first aspect and various possible designs of the first aspect.

According to a sixth aspect, according to one or more embodiments of the present disclosure, there is provided a computer program which, when executed by a processor, implements the method for displaying a feed flow according to the first aspect and various possible designs of the first aspect.

The foregoing description is merely illustrative of the preferred embodiments of the present disclosure and of the technical principles applied thereto. As will be appreciated by those skilled in the art, the disclosure of the present disclosure is not limited to the technical solution formed by the specific combination of the described technical features, it should also cover other technical solutions formed by any combination of the described technical features or equivalent features thereof without departing from the described disclosed concept. For example, the above features and technical features having similar functions disclosed in the present disclosure (but not limited thereto) are replaced with each other to form a technical solution.

In addition, while operations are depicted in a particular order, this should not be understood as requiring that the operations be performed in the particular order shown or in sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

What is claimed is:

1. A method for displaying a feed flow, wherein the method is applied at a terminal device, the terminal device comprises: a feed flow client, a player container, and a WebView container, the method comprising:
   presenting a feed flow interface;
   displaying, via the player container, a video content corresponding to a first feed flow element in the feed flow in the feed flow interface, a type of the first feed flow element being a video type;
   in response to detecting a predetermined swipe operation input by a user in the feed flow interface, determining, via the feed flow client, a second feed flow element to be displayed in the feed flow;
   in response to a type of the second feed flow element being an interactive type, loading, via the feed flow client, an interactive material of an interactive content recommended by the second feed flow element into the WebView container;
   displaying, via the WebView container, an interaction process of the interactive content in the feed flow interface, the interaction process presenting a process of the interactive material changing with an interaction operation input by the user, and the interaction process indicating an interaction process of using the interactive content; and
   in response to a display progress indicating that the interaction process has been completely displayed, displaying a first mask layer in the feed flow interface via the feed flow client, the first mask layer comprising at least one of the following information: a second download control for triggering the download of the interactive content, and a re-interaction control for triggering a re-display of the interaction process.

2. The method of claim 1, further comprising:
   before displaying the interaction process of the interactive content in the feed flow interface via the WebView container, adding an interactive page layer between a content page layer and an interface component layer of the feed flow interface via the feed flow client; wherein the content page layer is used for displaying a video picture of a feed flow element of a video type, and a size of the interactive page layer is the same as a size of the content page layer, wherein
   the displaying an interaction process of the interactive content in the feed flow interface via the WebView container comprises displaying the interaction process in the interactive page layer via the WebView container.

3. The method of claim 2, wherein the interactive material of the interactive content comprises M interaction triggering materials and interaction result materials corresponding to the respective interaction triggering materials, and M is an integer greater than or equal to 1;
   the displaying the interaction process in the interactive page layer via the WebView container comprises:
   displaying an i-th interaction triggering material in the interactive page layer via the WebView container;
   in response to detecting an interaction operation input by the user for the i-th interaction triggering material, displaying an interaction result material corresponding to the i-th interaction triggering material in the interactive page layer via the WebView container;
   wherein i is equal to 1, 2, . . . , M in turn.

4. The method of claim 2, further comprising:
   acquiring the display progress of the interaction process via the WebView container; and
   in response to the display progress being a predetermined progress, displaying a first download control at the interface component layer via the feed flow client, the first download control being used for downloading the interactive content.

5. The method of claim 2, further comprising:
   monitoring, via the feed flow client, an operational state of the WebView container;
   in response to the operational state of the WebView container being monitored as an abnormal state, performing one of the following:
   displaying a second mask layer in the feed flow interface via the feed flow client, the second mask layer being located between the interactive page layer and the interface component layer, the second mask layer comprising at least one of the following information: detail information of the interactive content, a second download control for triggering the download of the interactive content, and a re-interaction control for triggering a re-display of the interaction process; or,
   controlling, via the feed flow client, the WebView container to display a next interaction triggering material in the interactive page layer.

6. The method of claim 1, wherein the method further comprises: before loading, via the feed flow client, the interactive material of the interactive content recommended by the second feed flow element into the WebView container:
   determining, via the feed flow client, a reference feed flow element corresponding to the second feed flow element in the feed flow, the reference feed flow element being located before the second feed flow element and spaced apart from the second feed flow element by K feed flow elements, K being an integer greater than or equal to 0;
   in response to detecting that the reference feed flow element is being displayed in the feed flow interface, obtaining resource data corresponding to the second feed flow element, and performing a rendering processing on the resource data via the feed flow client to acquire the interactive material of the interactive content.

7. The method of claim 6, further comprising:
receiving, via the feed flow client, the feed flow from a server;
obtaining, via the feed flow client, resource address information about the second feed flow element from the feed flow;
obtaining, via the feed flow client, the resource data corresponding to the second feed flow element from the server based on the resource address information, and caching the resource data in a predetermined storage space;
obtaining resource data corresponding to the second feed flow element, and performing a rendering processing on the resource data via the feed flow client to acquire the interactive material of the interactive content comprises:
obtaining, via the feed flow client, the resource data corresponding to the second feed flow element from the predetermined storage space, and performing the rendering processing on the resource data to acquire the interactive material of the interactive content.

8. The method of claim 1, wherein the interactive content is an application program or a web program.

9. An electronic device, comprising: a processor and a memory;
wherein the memory stores computer executable instructions;
the processor executes the computer executable instructions to carry out a method comprising:
presenting a feed flow interface;
displaying, via the player container, a video content corresponding to a first feed flow element in the feed flow in the feed flow interface, a type of the first feed flow element being a video type;
in response to detecting a predetermined swipe operation input by a user in the feed flow interface, determining, via a feed flow client, a second feed flow element to be displayed in the feed flow;
in response to a type of the second feed flow element being an interactive type, loading, via the feed flow client, an interactive material of an interactive content recommended by the second feed flow element into the WebView container;
displaying, via the WebView container, an interaction process of the interactive content in the feed flow interface, the interaction process presenting a process of the interactive material changing with an interaction operation input by the user, and the interaction process indicating an interaction process of using the interactive content; and
in response to a display progress indicating that the interaction process has been completely displayed, displaying a first mask layer in the feed flow interface via the feed flow client, the first mask layer comprising at least one of the following information: a second download control for triggering the download of the interactive content, and a re-interaction control for triggering a re-display of the interaction process.

10. The electronic device of claim 9, wherein the processor executes the computer executable instructions to carry out the method further comprising: before displaying the interaction process of the interactive content in the feed flow interface via the WebView container,
adding an interactive page layer between a content page layer and an interface component layer of the feed flow interface via the feed flow client; wherein the content page layer is used for displaying a video picture of a feed flow element of a video type, and a size of the interactive page layer is the same as a size of the content page layer, and wherein
the displaying an interaction process of the interactive content in the feed flow interface via the WebView container comprises displaying the interaction process in the interactive page layer via the WebView container.

11. The electronic device of claim 10, wherein the interactive material of the interactive content comprises M interaction triggering materials and interaction result materials corresponding to the respective interaction triggering materials, and M is an integer greater than or equal to 1;
the displaying the interaction process in the interactive page layer via the WebView container comprises:
displaying an i-th interaction triggering material in the interactive page layer via the WebView container;
in response to detecting an interaction operation input by the user for the i-th interaction triggering material, displaying an interaction result material corresponding to the i-th interaction triggering material in the interactive page layer via the WebView container;
wherein i is equal to 1, 2, . . . , M in turn.

12. The electronic device of claim 10, wherein the processor executes the computer executable instructions to carry out the method further comprising:
acquiring the display progress of the interaction process via the WebView container; and
in response to the display progress being a predetermined progress, displaying a first download control at the interface component layer via the feed flow client, the first download control being used for downloading the interactive content.

13. The electronic device of claim 10, wherein the processor executes the computer executable instructions to carry out the method further comprising:
monitoring, via the feed flow client, an operational state of the WebView container;
in response to the operational state of the WebView container being monitored as an abnormal state, performing one of the following:
displaying a second mask layer in the feed flow interface via the feed flow client, the second mask layer being located between the interactive page layer and the interface component layer, the second mask layer comprising at least one of the following information: detail information of the interactive content, a second download control for triggering the download of the interactive content, and a re-interaction control for triggering a re-display of the interaction process; or,
controlling, via the feed flow client, the WebView container to display a next interaction triggering material in the interactive page layer.

14. The electronic device of claim 9, wherein the method further comprises: before loading, via the feed flow client, the interactive material of the interactive content recommended by the second feed flow element into the WebView container:
determining, via the feed flow client, a reference feed flow element corresponding to the second feed flow element in the feed flow, the reference feed flow element being located before the second feed flow element and spaced apart from the second feed flow element by K feed flow elements, K being an integer greater than or equal to 0;
in response to detecting that the reference feed flow element is being displayed in the feed flow interface, obtaining resource data corresponding to the second feed flow element, and performing a rendering processing on the resource data via the feed flow client to acquire the interactive material of the interactive content.

15. The electronic device of claim 14, wherein the processor executes the computer executable instructions to carry out the method further comprising:
receiving, via the feed flow client, the feed flow from a server;
obtaining, via the feed flow client, resource address information about the second feed flow element from the feed flow;
obtaining, via the feed flow client, the resource data corresponding to the second feed flow element from the server based on the resource address information, and caching the resource data in a predetermined storage space;
obtaining resource data corresponding to the second feed flow element, and performing a rendering processing on the resource data via the feed flow client to acquire the interactive material of the interactive content comprises:
obtaining, via the feed flow client, the resource data corresponding to the second feed flow element from the predetermined storage space, and performing the rendering processing on the resource data to acquire the interactive material of the interactive content.

16. The electronic device of claim 9, wherein the interactive content is an application program or a web program.

17. A non-transitory computer readable storage medium having computer executable instructions stored thereon, wherein the computer executable instructions, when executed by a processor, carry out a method comprising:
presenting a feed flow interface;
displaying, via the player container, a video content corresponding to a first feed flow element in the feed flow in the feed flow interface, a type of the first feed flow element being a video type;
in response to detecting a predetermined swipe operation input by a user in the feed flow interface, determining, via a feed flow client, a second feed flow element to be displayed in the feed flow;
in response to a type of the second feed flow element being an interactive type, loading, via the feed flow client, an interactive material of an interactive content recommended by the second feed flow element into the WebView container;
displaying, via the WebView container, an interaction process of the interactive content in the feed flow interface, the interaction process presenting a process of the interactive material changing with an interaction operation input by the user, and the interaction process indicating an interaction process of using the interactive content; and
in response to a display progress indicating that the interaction process has been completely displayed, displaying a first mask layer in the feed flow interface via the feed flow client, the first mask layer comprising at least one of the following information: a second download control for triggering the download of the interactive content, and a re-interaction control for triggering a re-display of the interaction process.

18. The non-transitory computer readable storage medium of claim 17, wherein the computer executable instructions, when executed by a processor, carry out the method further comprising:
before displaying the interaction process of the interactive content in the feed flow interface via the WebView container, adding an interactive page layer between a content page layer and an interface component layer of the feed flow interface via the feed flow client; wherein the content page layer is used for displaying a video picture of a feed flow element of a video type, and a size of the interactive page layer is the same as a size of the content page layer, and wherein
the displaying an interaction process of the interactive content in the feed flow interface via the WebView container comprises displaying the interaction process in the interactive page layer via the WebView container.

19. The non-transitory computer readable storage medium of claim 18, wherein the interactive material of the interactive content comprises M interaction triggering materials and interaction result materials corresponding to the respective interaction triggering materials, and M is an integer greater than or equal to 1;
the displaying the interaction process in the interactive page layer via the WebView container comprises:
displaying an i-th interaction triggering material in the interactive page layer via the WebView container;
in response to detecting an interaction operation input by the user for the i-th interaction triggering material, displaying an interaction result material corresponding to the i-th interaction triggering material in the interactive page layer via the WebView container;
wherein i is equal to 1, 2, . . . , M in turn.

20. The non-transitory computer readable storage medium of claim 18, wherein the computer executable instructions, when executed by a processor, carry out the method further comprising:
acquiring the display progress of the interaction process via the WebView container; and
in response to the display progress being a predetermined progress, displaying a first download control at the interface component layer via the feed flow client, the first download control being used for downloading the interactive content.

* * * * *